(12) United States Patent
Kusukame et al.

(10) Patent No.: US 9,863,660 B2
(45) Date of Patent: Jan. 9, 2018

(54) SENSING METHOD AND SENSING SYSTEM, AND AIR CONDITIONING DEVICE HAVING THE SAME

(71) Applicant: Panasonic Intellectual Property Corporation of America, Torrance, CA (US)

(72) Inventors: Koichi Kusukame, Nara (JP); Shinichi Shikii, Nara (JP); Hideto Nakahigashi, Osaka (JP); Nawatt Silawan, Osaka (JP); Aki Yoneda, Hyogo (JP); Kazuki Funase, Osaka (JP); Tsutomu Shimizu, Kanagawa (JP); Hayuri Sasaki, Shiga (JP); Ikuo Akamine, Shiga (JP); Kazuyo Hatta, Shiga (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 227 days.

(21) Appl. No.: 14/632,891

(22) Filed: Feb. 26, 2015

(65) Prior Publication Data

US 2015/0247647 A1 Sep. 3, 2015

(30) Foreign Application Priority Data

Mar. 3, 2014 (JP) .................. 2014-040828
Oct. 9, 2014 (JP) .................. 2014-208308

(51) Int. Cl.
*G06K 9/00* (2006.01)
*F24F 11/00* (2006.01)
(Continued)

(52) U.S. Cl.
CPC ........ *F24F 11/006* (2013.01); *F24F 11/0034* (2013.01); *G06K 9/00362* (2013.01);
(Continued)

(58) Field of Classification Search
CPC ................ F24F 11/0034; F24F 11/006; G06K 9/00362; G06K 9/2018; G06K 9/3241;
(Continued)

(56) References Cited

U.S. PATENT DOCUMENTS

2010/0063636 A1* 3/2010 Matsumoto .......... F24F 11/0012
700/276
2011/0213501 A1* 9/2011 Jin ........................ F24F 11/001
700/276
(Continued)

FOREIGN PATENT DOCUMENTS

| JP | 2011-080667 | | 4/2011 | |
|----|-------------|---|--------|---|
| JP | 2011-242129 | | 12/2011 | |
| KR | 20010001673 | * | 1/2001 | ................ G01J 1/22 |

OTHER PUBLICATIONS

Shinji et al (Development of Multi-functional Sensor Module for Energy Saving Air conditioner System, 2012 second workshop on Design, control and software implementation for distributed MEMS, IEEE computer society, pp. 96-100).*

*Primary Examiner* — Amara Abdi
(74) *Attorney, Agent, or Firm* — Greenblum & Bernstein, P.L.C.

(57) ABSTRACT

A sensing method includes acquiring a thermal image of an object space, identifying an object within the object space included in the thermal image, based on the acquired thermal image, presenting to a user the thermal image to which information, indicating identification results of the identifying, has been added, and accepting a response as to the presented thermal image to which the information has been added. And at least one of the acquiring, the identifying, the presenting, and the accepting is performed by a processor.

18 Claims, 35 Drawing Sheets

(51) Int. Cl.
*H04N 5/33* (2006.01)
*G06K 9/32* (2006.01)
*G06K 9/20* (2006.01)
*H04N 5/232* (2006.01)

(52) U.S. Cl.
CPC ......... *G06K 9/2018* (2013.01); *G06K 9/3241* (2013.01); *H04N 5/23219* (2013.01); *H04N 5/23229* (2013.01); *H04N 5/23245* (2013.01); *H04N 5/33* (2013.01)

(58) Field of Classification Search
CPC ........... H04N 5/23219; H04N 5/23229; H04N 5/23245; H04N 5/33
See application file for complete search history.

(56) References Cited

U.S. PATENT DOCUMENTS

| | | | | |
|---|---|---|---|---|
| 2012/0320086 | A1* | 12/2012 | Kasama | H04N 5/2258 345/629 |
| 2013/0342691 | A1* | 12/2013 | Lewis | H04N 5/332 348/143 |
| 2014/0267765 | A1* | 9/2014 | Stuart | G01D 7/08 348/164 |
| 2014/0365017 | A1* | 12/2014 | Hanna | F24F 11/001 700/276 |

\* cited by examiner

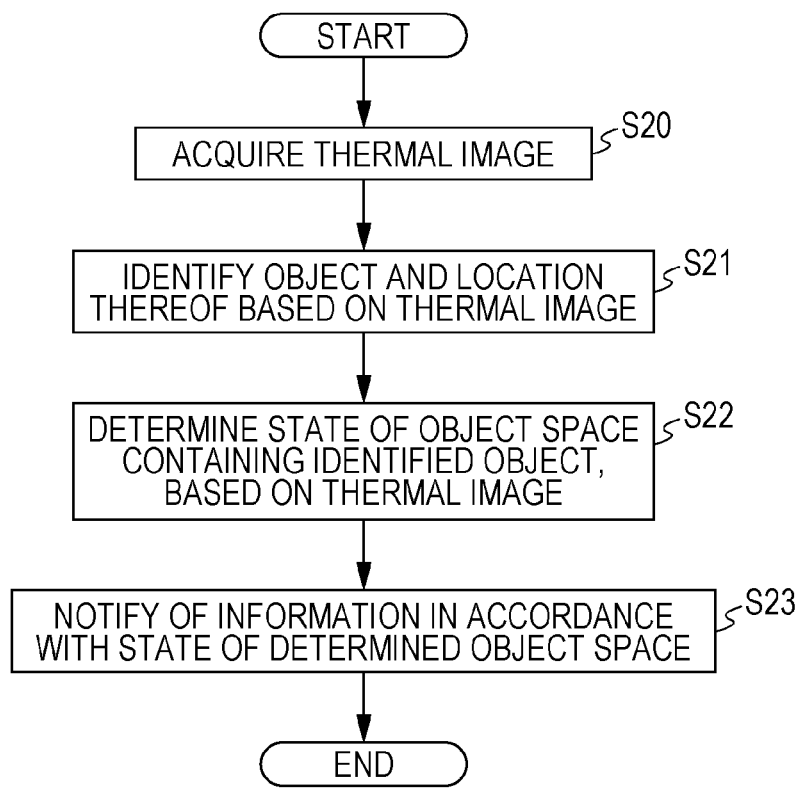

TELEPHONE

AIR CLEANER

TELEVISION SET

PERSON

PERSON

SENSING METHOD AND SENSING SYSTEM, AND AIR CONDITIONING DEVICE HAVING THE SAME

BACKGROUND

1. Technical Field

The present disclosure relates to a sensing method and a sensing system, and to an air conditioning device having the same.

2. Description of the Related Art

There has been proposed a technology where thermal distribution in a room, and person location information, are measured using a thermal image sensor, and the results are used for energy conservation and comfortable air conditioning (e.g., Japanese Patent No. 5289518).

SUMMARY

In one general aspect, the techniques disclosed here feature a sensing method including acquiring a thermal image of an object space, identifying an object, within the object space, included in the thermal image, based on the acquired thermal image, presenting to a user the thermal image to which information, indicating identification results of the identifying, has been added, and accepting a response as to the presented thermal image to which the information has been added. And at least one of the acquiring, the identifying, the presenting, and the accepting is performed by a processor.

According to the present disclosure, a sensing method and sensing system, and an air conditioning device having the same, can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flowchart illustrating an example of operations of the sensing system according to the first embodiment;

DETAILED DESCRIPTION

Figure 1:
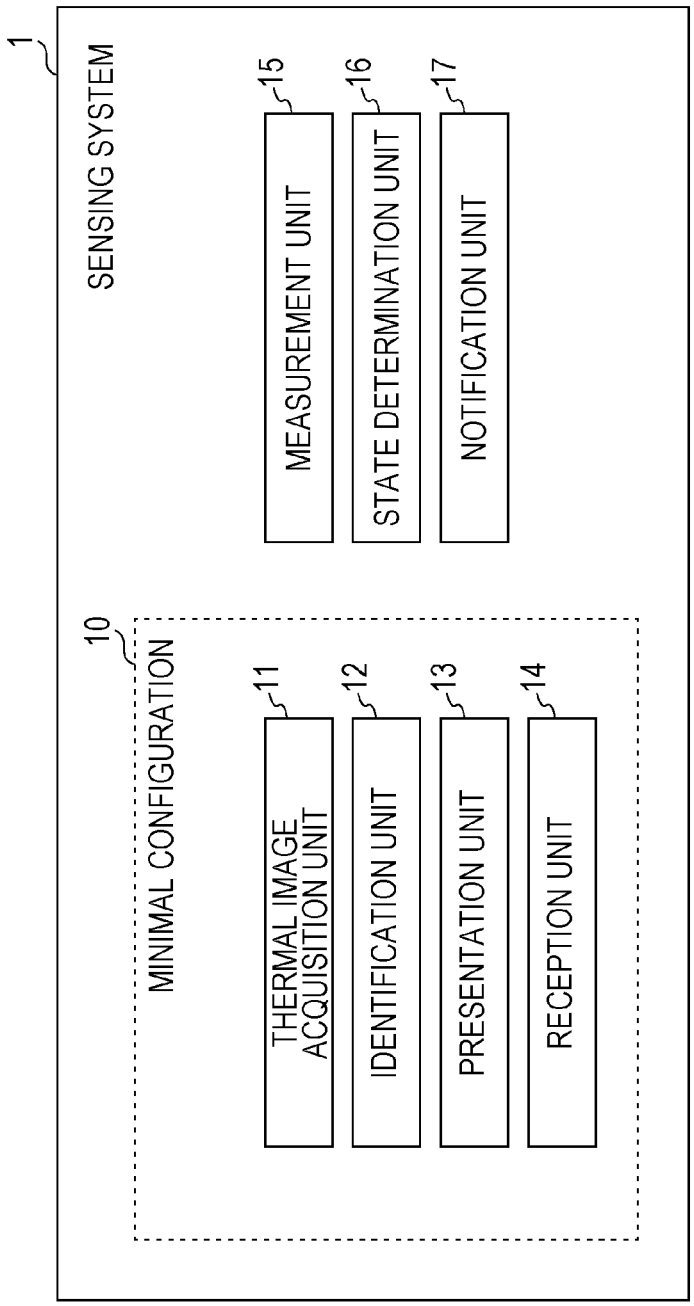
FIG. 1 is a diagram illustrating an example of a configuration of a sensing system according to a first embodiment.

First, matter which the Present Inventors studied to reach the embodiments of the present disclosure will be described.
Underlying Knowledge Forming Basis of the Present Disclosure There has been a problem in the technology disclosed in Japanese Patent No. 5289518, in that the user is not able to confirm whether recognition precision of a thermal image acquired by the thermal image sensor is low, so in cases where recognition precision is low, the user has to accept inefficient air conditioning control carried out by the air conditioner due to the low recognition precision.

The present disclosure has been made in light of the above-described problem, and accordingly it is an object thereof to provide a sensing method and a sensing system, and to an air conditioning device having the same, capable of improving recognition precision of thermal images.

A sensing method according to an aspect of the present disclosure includes: acquiring a thermal image of an object space; identifying an object, within the object space, included in the thermal image, based on the acquired thermal image; presenting to a user the thermal image to which information, indicating identification results of the identifying, has been added; and accepting a response as to the presented thermal image to which the information has been added. And at least one of the acquiring, the identifying, the presenting, and the accepting is performed by a processor.

According to this configuration, a sensing method can be provided with improved recognition precision.

In a case where the accepted response is an alteration instruction regarding the identification results, the identification results of the object included in the thermal image may be altered in the identifying, in accordance with the alteration instruction.

The object may include at least one of a person, animal, electrical appliance, and laundry, in the object space.

The identifying may include determining thermal distribution represented in the acquired thermal image, determining and identifying the object, based on the determined thermal distribution, and determining a location in the object space of the identified object. The object and the location of the object may be included in the information representing the identification results, and presented in the presenting.

A region of a pixel group, indicating a predetermined temperature range in the acquired thermal image, may be determined to be the object in the determining of the object. A location of a region of a pixel group, indicating a predetermined temperature range in the acquired thermal image, may be determined to be a location of the object in the determining of the location of the object.

A region of a pixel group, indicating a predetermined first temperature range in the acquired thermal image, may be determined to be a person in the determining of the object. A region of a pixel group, indicating a predetermined second temperature range in the acquired thermal image that is different from the predetermined first temperature range, may be determined to be an animal.

The sensing method may further include measuring temperature distribution in the object space and outputting the measured temperature distribution as the thermal image, determining a state in the object space including the identified object, based on the thermal image, and notifying the user of notification information relating to the determined state of the object space.

The sensing method may further include determining whether or not there is the notification information of which the user should be notified, and acquiring humidity information of the object space. The state of the object space including the identified object may be determined in the determining of the state, based on the thermal image and the humidity information, and the user may be notified of the notification information in the notifying, in a case where judgment is made that there is the notification information, in the determining of whether or not there is the notification information.

The sensing method may further include determining whether or not there is the notification information of which the user should be notified, based on the state of the object space determined in the determining of the state. The user may be notified of the notification information in the notifying, in a case where judgment is made that there is the notification information, in the determining of whether or not there is the notification information.

The sensing method may further include controlling an air environment of the object space, based on the state of the object determined in the determining of the state.

The sensing method may further include acquiring humidity information of the object space. The air environment of the object space may be controlled in the controlling based on the state of the object determined in the determining of the state, and the humidity information.

The air environment may include at least one of temperature, humidity, wind speed, and direction of wind, of air in the object space.

The sensing method may further include acquiring humidity information of the object space, analyzing a state of the identified object, based on the thermal image and the humidity information, and determining whether or not there is the notification information of which the user should be notified, based on analyzing results from the analyzing. The user may be notified of the notification information in the notifying, in a case where judgment is made that there is the notification information, in the determining of whether or not there is the notification information.

Registration of information relating to the object may be accepted beforehand, in the accepting.

The information relating to the object may include at least one of types of the object, weight, age, and location.

The humidity information of the object space may be humidity distribution of the object space, and in the acquiring of the humidity information, humidity in the object space may be measured, and the humidity distribution of the object space may be calculated based on the measured humidity and thermal distribution represented in the acquired thermal image.

The user may be notified of lifestyle improvement proposal information, proposing to the user a lifestyle improvement method, based on at least the humidity distribution.

A sensing system according to an aspect of the present disclosure includes a thermal image acquirer that acquires a thermal image of an object space, an identifier that identifies an object within the object space included in the thermal image, based on the thermal image acquired by the thermal image acquirer, a presenter that adds information indicating identification results from the identifier to the thermal image, and that presents to the user the thermal image to which the identification results have been added, and a receptor that accepts a response as to the thermal image to which the information has been added, that has been presented by the presenter.

An air conditioner according to an aspect of the present disclosure includes a thermal image acquirer that acquires a thermal image of an object space, an identifier that identifies an object within the object space included in the thermal image, based on the thermal image acquired by the thermal image acquirer, a presenter that adds information indicating identification results from the identifier to the thermal image, and that presents to the user the thermal image to which the identification results have been added, and a receptor that accepts a response as to the thermal image to which the information has been added, that has been presented by the presenter.

These general or specific aspects may be realized by a system, method, integrated circuit, computer program, or computer-readable recording medium such as a CD-ROM, and may be realized by any combination of a system, method, integrated circuit, computer program, and recording medium. The following is a detailed description of a sensing method according to an aspect of the present disclosure. Note that the descriptions made in the embodiments described below are all specific examples of the present disclosure. Values, shapes, materials, components, placements of components, and so forth, are only exemplary, and do not restrict the present disclosure. Components in the following embodiments which are not included in an independent Claim indicating the highest concept are described as being optional components. The embodiments described below are only exemplary arrangements for realizing the sensing method and so forth according to an aspect of the present disclosure, and do not restrict the present system. The present system may be configured by combining any of the arrangements.

First Embodiment

Configuration of Sensing System

Figure 2:
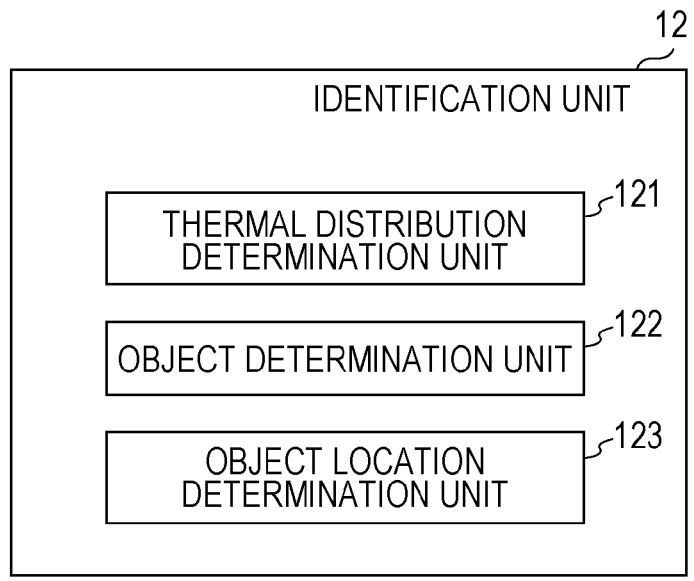
FIG. 2 is a diagram illustrating an example of a detailed configuration of an identification unit in the first embodiment.
Figure 3:
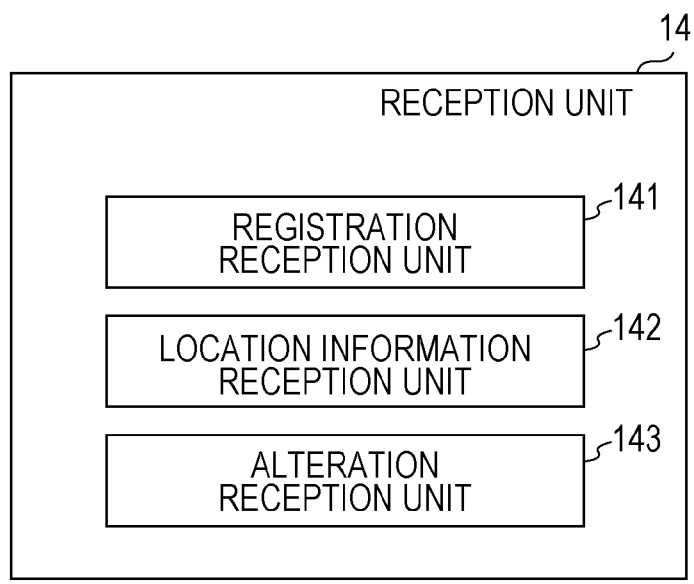
FIG. 3 is a diagram illustrating an example of a detail configuration of a reception unit in the first embodiment.

A sensing system according to a first embodiment will be described with reference to the drawings. FIG. 1 is a diagram illustrating an example of a configuration of a sensing system 1 according to the first embodiment, FIG. 2 is a diagram illustrating an example of a detailed configuration of an identification unit 12 in the first embodiment, and FIG. 3 is a diagram illustrating an example of a detail configuration of a reception unit 14 in the first embodiment.

The sensing system 1 illustrated in FIG. 1 is provided with a minimal configuration 10, a measurement unit 15, a state determination unit 16, and a notification unit 17. The minimal configuration 10 includes a thermal image acquisition unit 11, an identification unit 12, a presentation unit 13, and a reception unit 14. That is to say, the measurement unit 15, state determination unit 16, and notification unit 17 are not indispensible configurations to the sensing system 1.

The thermal image acquisition unit 11 acquires thermal image of an object space. The thermal image acquisition unit 11 according to the present embodiment acquires thermal images which the measurement unit 15 outputs.

The identification unit 12 identifies objects in the object space included in the thermal image, based on the thermal image acquired by the thermal image acquisition unit 11. The term "object" as used here includes at least one of a person, animal, electrical appliance, and laundry, in the object space. In a case where a response accepted by the reception unit 14 is an instruction to alter identification results, the identification unit 12 alters the identification of the object included in the thermal image, in accordance with this alteration instruction. Note that an arrangement may be made where the identification unit 12 performs identification of an object based on the thermal image acquired by the thermal image acquisition unit 11, in collaboration with an application installed in a cloud communicable with the sensing system 1 or installed in the sensing system 1.

The identification unit 12 according to the present embodiment includes a thermal distribution determination unit 121, an object determination unit 122, and an object location determination unit 123, as illustrated in FIG. 2.

The thermal distribution determination unit 121 determines a thermal distribution expressed in the thermal image acquired by the thermal image acquisition unit 11.

The object determination unit 122 determines and identifies objects, based on the thermal distribution determined by the thermal distribution determination unit 121. The object determination unit 122 determines a region of a pixel group exhibiting a predetermined temperature range in the thermal image acquired by the thermal image acquisition unit 11 to be an object. For example, the object determination unit 122 may determine a range of a pixel group exhibiting a predetermined first temperature range in the thermal image acquired by the thermal image acquisition unit 11, to be a person, and a range of a pixel group exhibiting a predetermined second temperature range in the thermal image, different from the first temperature range, to be an animal.

The object location determination unit 123 determines, regarding the object identified by the object determination unit 122, the location thereof in the object space. For example, the object location determination unit 123 determines the location of a region of a pixel group exhibiting a predetermined temperature range in the thermal image acquired by the thermal image acquisition unit 11 to be the location of the object. An arrangement also may be made where, for example, the object location determination unit 123 determines the location of a region of a pixel group exhibiting a predetermined first temperature range in the thermal image acquired by the thermal image acquisition unit 11 to be the location of a person, and determines the location of a region of a pixel group exhibiting a second temperature range in the thermal image, different from the first temperature range, to be the location of an animal.

The presentation unit 13 presents the user with the thermal image, with information indicting the results of the identification performed by the identification unit 12 added thereto. Note that the presentation unit 13 may present the information in a manner indicating the identification results including objects and the locations of the objects. The presentation unit 13 may also perform this presenting by transmitting the thermal image to which the identification results have been added, to a mobile terminal of the user such as a smartphone or the like.

The reception unit 14 accepts responses to the thermal image, to which the above-described information has been added, presented by the presentation unit 13. Note that the reception unit 14 may accept responses from a mobile terminal of the user such as a smartphone or the like, or may accept responses by the user directly giving instructions. The reception unit 14 may also accept registration of information relating to an object beforehand. Thus, the sensing system 1 can precisely identify objects in thermal images.

The reception unit 14 according to the present embodiment includes a registration reception unit 141, a location information reception unit 142, and an alteration reception unit 143 as illustrated in FIG. 3, for example.

The registration reception unit 141 accepts registration of information relating to objects beforehand. That is to say, the registration reception unit 141 accepts beforehand registration of information which the identification unit 12 can use to identify objects and which relates to the objects, before the identification unit 12 identifies the objects. Information which relates to objects may include at least one of the type of object, weight, and age. The information which relates to objects may also include, as described later in Example 1 and Example 2, the fact that a user has a pet, the type of pet food, the location where the pet urinates, and so forth, for example. Also, a region where a pet such as a goldfish is may be specified (registered) as a region indicating a pet in the thermal image, for example, as a response to the thermal image presented by the presentation unit 13 to which the identification results have been added, as described later in Example 1 and Example 2.

The location information reception unit 142 accepts registration of information relating to the location of objects beforehand. Note that the location information reception unit 142 may accept registration of information which relates to the location of objects as a response to the thermal image presented by the presentation unit 13 to which the identification results have been added.

The alteration reception unit 143 accepts responses to the thermal image to which the above-described information has been added, presented by the presentation unit 13. For example, in a case where the response which the reception unit 14 has accepted is an instruction to alter the identification results, the identification unit 12 alters the identification of the object included in the thermal image, based on this alteration instruction.

The measurement unit 15 measures thermal distribution in an object space, and outputs as a thermal image.

The state determination unit 16 determines the state of an object space including objects, identified by the identification unit 12, based on the thermal image which the thermal image acquisition unit 11 has acquired. This state determination may be determining of a state where there are no people in the object state (no one home), or a state where both a person (people) and animal(s) are present in the object space, as described later in Example 1 and Example 2. In a case where the object is a dog, the type (breed) of dog may be determined, if the object is a person, the likelihood of a heat stroke may be determined from the thermal distribution of the person, and in the case where the object is a pet, the state of the pet may be determined.

The notification unit 17 notifies the user of information according to the state of the object space, determined by the state determination unit 16. Note that the notification unit 17 may notify this information to a mobile terminal of the user, such as a smartphone. This information may be information to the effect that there is no one in the object space (to say that there is no one home), or may be recommended control contents depending on the dog breed and the current season, or may be suitable air conditioning, or may be a state of a pet that has been determined, for example, as described later in Example 1 and Example 2.

Operations of Sensing System

Figure 4:
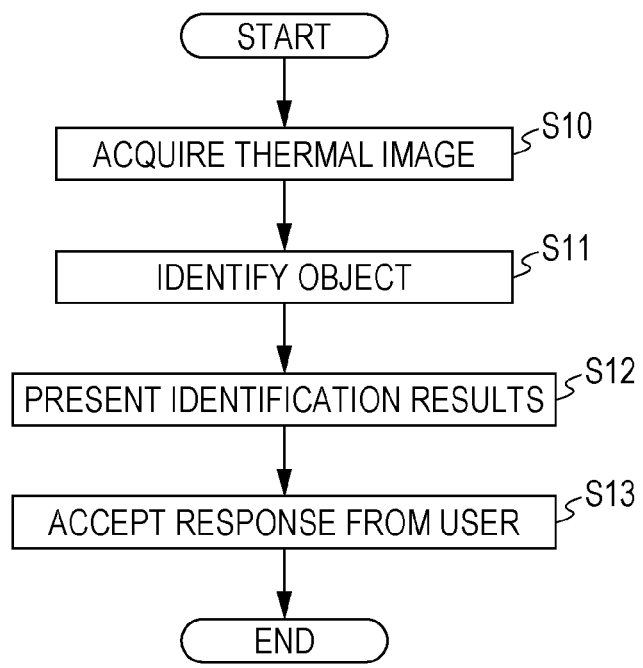
FIG. 4 is a flowchart illustrating an example of operations of the sensing system according to the first embodiment.

Next, the operations of the sensing system 1 configured as described above will be described. FIG. 4 is a flowchart illustrating an example of operations of the sensing system 1 according to the first embodiment.

First, the sensing system 1 acquires a thermal image of an object space (S10).

Next, the sensing system 1 identifies an object in the object space included in the thermal image, based on the thermal image acquired in S10 (S11).

The sensing system 1 then adds information indicating the identification results from S11 to the thermal image, and presents this to the user (S12).

The sensing system 1 thereafter accepts response to the thermal image to which the information has been added and presented in S12 (S13).

The user can thus confirm the identification results by the thermal image with identification results added thereto being presented to the user, and be at ease in accepting operations based on the identification results. In a case where the identification results are incorrect, the user can give correction instructions regarding the identification results, so the recognition precision can be improved. Further, in addition to correction of the identification results as a user response, the user can cause the sensing system 1 to learn what region of the thermal image is an object (i.e., the user can teach the sensing system 1), so recognition precision of the thermal images can be even further improved.

Next, operations which the sensing system 1 performs after having performed the operations illustrated in FIG. 4 will be described. FIG. 5 is a flowchart illustrating an example of operations of the sensing system 1 according to the first embodiment.

First, the sensing system 1 acquires a thermal image of the object space (S20).

Next, the sensing system 1 identifies an object in the object space included in the thermal image, based on the thermal image acquired in S20, and also identifies the location of the object (S21).

The sensing system 1 then determines the state of the object space including the object identified in S21, based on the thermal image (S22).

The sensing system 1 then notifies the user of information according to the state of the object space determined in S22 (S23).

The following is a description of an example of operations of the sensing system 1 illustrated in FIG. 5, by way of Examples 1 and 2.

Example 1: Air Conditioning or Monitoring by Pet Air Conditioner

Figure 6A:
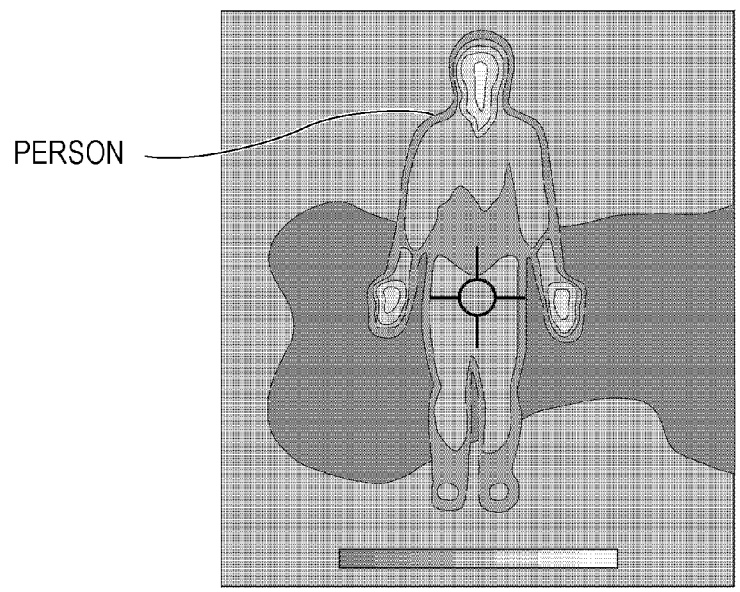
FIGS. 6A and 6B are illustrative drawings of thermal images in an Example 1 of the first embodiment.
Figure 6B:
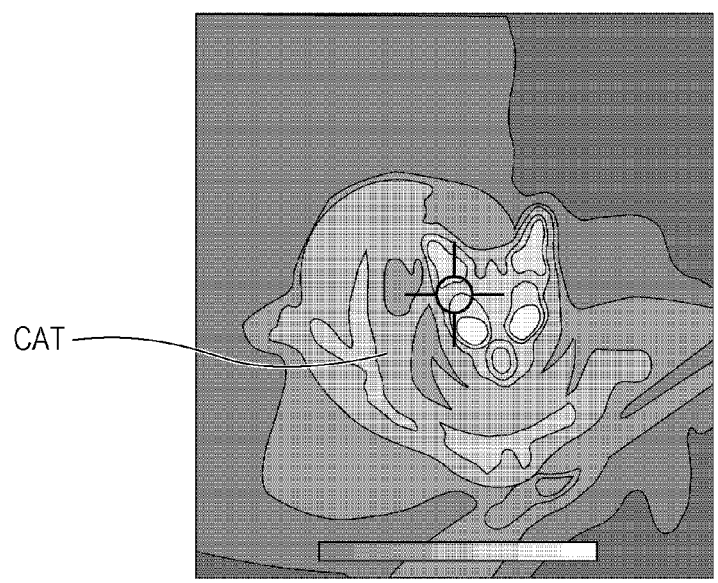

An example of operations of an air conditioner (pet air conditioner) having the sensing system 1 will be described in Example 1. FIGS. 6A and 6B are illustrative drawings of thermal images in Example 1 of the first embodiment. The thermal images in FIGS. 6A and 6B show thermal distribution in a simplified manner.

In a case of having acquired a thermal image such as illustrated in FIG. 6A, the sensing system 1 determines the object and the location thereof, based on a region in the thermal image in FIG. 6A exhibiting a predetermined temperature range, the shape of the region, and the movement of the region, and thus can determine that the object is a person. In the same way, in a case of having acquired a thermal image such as illustrated in FIG. 6B, the sensing system 1 determines the object and the location thereof, based on a region in the thermal image in FIG. 6B exhibiting a predetermined temperature range, the shape of the region, and the movement of the region, and thus can determine that the object is a cat.

Away-from-Home Mode, At-Home Mode

The sensing system 1 can determine whether or not there is a person in the object space, for example, based on the thermal image. Accordingly, in a case of having determined that there is no one in an object space such as a house for example, the sensing system 1 can determine that there is no one home, and may give notification to that effect (to the effect that there is no one home, currently in away-from-home mode, etc.). The sensing system 1 may further communicate with a mobile terminal of the user such as a smartphone, and determine that the user is away from home depending on the location of the mobile terminal.

Further, the air conditioner having the sensing system 1 may operate according to the determined mode (away-from-home mode or at-home mode).

Notification of Recommendations

The sensing system 1 can, for example, determine whether or not there is a person or people, and/or animal(s), in the object space based on the thermal image. Accordingly, in a case where the sensing system 1 has determined that there is a person and an animal together in the object space, which of the person and animal is given priority may be selected, and notification made to that effect (to the effect of currently being in the at-home mode, etc.).

In a case where the air conditioner having the sensing system 1 determines that there is a person and an animal together in the object space, air conditioning operations for whichever of the person and animal that priority has been given to may be performed. Which of the person and animal that priority has been given to may be registered in the sensing system 1 beforehand, or registration may be made such that priority is given to the animal during summer but priority is given to the person during winter, for example.

Further, in a case where determination can be based on the thermal image that the object is a dog, and further the breed of the dog can be determined, the air conditioner having the sensing system 1 may propose (notify) recommended control contents for each season according to the determined breed. In a case where determination can be made based on the thermal image that the object is a dog, and that the tongue of the dog is hanging out, the air conditioner having the sensing system 1 may judge that the object space is hot, and effect control to cool the object space. That is to say, the air conditioner having the sensing system 1 may change the air conditioning control by determining from the thermal image that the tongue of an animal such as a dog is hanging out, according to the thermal image. The shape of the tongue of the animal may be set (registered) by the user beforehand. Note that the tongue of an animal is hotter than other portions (body portions other than the tongue), so an optional threshold value may be set and portions exceeding this threshold value be determined to be a tongue.

Notification of Other Recommendations

The air conditioner having the sensing system 1 may also determine based on the thermal image that the identified object is a person, and how likely that person is to suffer a heat stroke, based on the state of the person (surface thermal distribution). In this case, the air conditioner having the sensing system 1 may give notification of a recommendation to keep water close at hand, and if there is a way to perform air conditioning more efficient than this air conditioner, give notification to that effect as well. The temperature of the forehead of the person may be used as a reference to determine how likely that person is to suffer a heat stroke. For example, judgment may be made that a person is likely to suffer a heat stroke if the temperature of the forehead exceeds a predetermined value. As another determination reference, judgment may be made that a person is likely to suffer a heat stroke if the difference between the temperature of the nose of the person and the temperature of the forehead falls below a predetermined temperature difference.

Notification of State of Pet

The sensing system 1 may determine whether or not there is a pet (animal) in the object space, based on the thermal image. Accordingly, in a case where the sensing system 1 determines that there is a pet in the object space, the state of the pet may be determined based on the thermal image, and saved as a log. The state of the pet here may be the sleeping hours of the pet, the time at which the pet wakes up, the physical condition of the pet estimated from these, and so forth. Determination of the state of the pet may be performed by calculating the number of times of movement or relocation of the pet, posture, surface temperature, and so forth, from the thermal image. The sensing system 1 may then notify the user of the state of the pet in the object space.

Feeding the Pet

The sensing system 1 can, for example, determine whether or not there is a pet (animal) in the object space, based on the thermal image. Accordingly, in a case of determining that there is a pet in the object space, the sensing system 1 may further determine the location of the pet and the location of a feeder for the pet, based on the thermal image. In a case where the pet approaches the feeder, the sensing system 1 may feed the pet by notifying the feeder of the amount of time to open the feeder lid, and so forth.

Further, the sensing system 1 may estimate (determine) the amount of activity of the pet from the determined pet location, and thus adjust the amount of food by notifying information to adjust the amount of time to open the feeder lid.

User Registration

Information relating to objects is registered in the sensing system 1 beforehand, to improve recognition precision of thermal images, as described earlier. For example, just the fact that the user has a pet may be registered as information relating to an object (pet), or the type of the pet (dog, cat, bug, goldfish) may be registered. Further, the weight and age of the pet may be registered, or the type of pet food of the pet may be registered. A heavy pet may not be readily distinguished from a person. Accordingly, in a case where a heavy pet is registered, the sensing system 1 may present the user with a warning to the effect that the pet may not be readily determined from thermal images.

An arrangement may be made where the air conditioner having the sensing system 1 can select a pet air conditioning mode while people are not at home, and also an arrangement may be made where the pet air conditioning mode or a user air conditioning mode cannot be selected when people are at home.

It should be noted that if the pet is a goldfish, the location of the goldfish cannot be determined from thermal distribution in a thermal image. Accordingly, the user may specify where an aquarium or the like, containing the goldfish, is in the thermal image presented by the sensing system 1. In this case, the air conditioner having the sensing system 1 performs air conditioning so that the temperature of the location (pixels) specified by the user is within a set range.

Registration of Monitoring Points

An arrangement may be made the user specifies a point (location) in a thermal image presented by the air conditioner having the sensing system 1, whereby air conditioning is performed such that the temperature of the point (location) which the user has specified stays within a set range. Conceivable points which a user might specify include regions include plants, goldfish, bugs, or the like, for example.

Image Registration

An image of a pet may be registered, to facilitate recognition of the pet in a thermal image. Accordingly, the pet can be recognized in the thermal image with high precision, based on the image of the pet. Further, the pet in a thermal image presented by the sensing system 1 may be recognized by the user specifying a region indicating the pet.

Urination Location

A urination location may be registered beforehand as information relating to the pet. In this case, if the temperature rises at a location other than the location registered beforehand and then falls by evaporation, the user may be notified by the sensing system 1.

Also, in a case where urination has been detected (determined) at a location other than the location registered beforehand, a cleaning robot or the like may be notified (instructed) not to move. Also, in a case where urination has been detected (determined) at a location other than the location registered beforehand, the sensing system 1 may immediately play a sound of scolding by the user (e.g., "Hey!") or make a sound that would be uncomfortable to the pet.

The sensing system 1 can detect (determine) urination by the pet based on thermal images, since a heat source other than that of the pet itself appears in the images and this new heat source does not move. Of course, the sensing system 1 may transmit to the user a thermal image to which the identification results have been added, and relegate to the user the final determination whether or not this is urine.

Example 2: Checking Usage Stage of Appliances

Figure 7A:
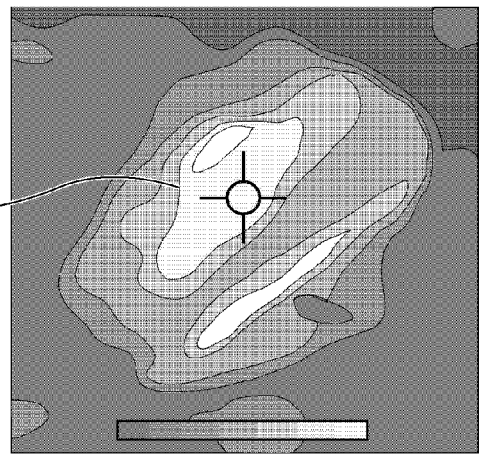
FIGS. 7A through 7C are illustrative drawings of thermal images in an Example 2 of the first embodiment.
Figure 7B:
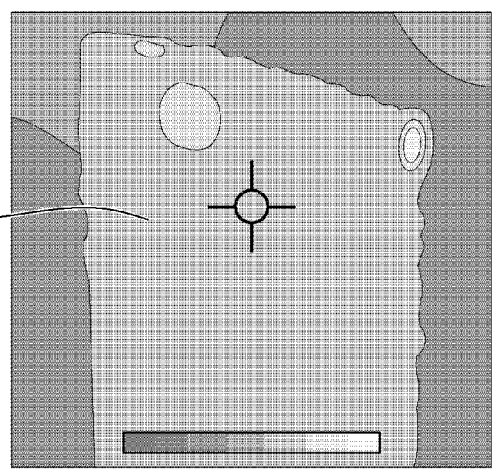
Figure 7C:
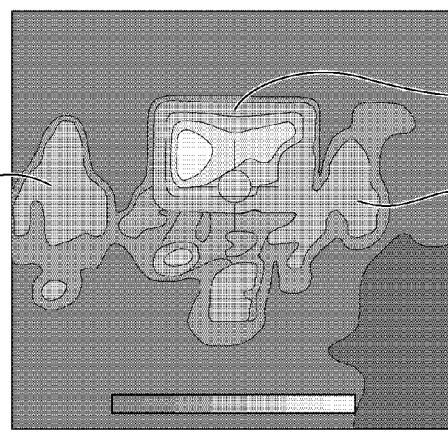

An example of operations of an air conditioner having the sensing system 1 will be described in Example 2. FIGS. 7A through 7C are illustrative drawings of thermal images in Example 2 of the first embodiment. The thermal images in FIGS. 7A through 7C show thermal distribution in a simplified manner.

In a case where the sensing system 1 acquires a thermal image such as illustrated in FIG. 7A, the sensing system 1 determines, from the region in the thermal image in FIG. 7A exhibiting a predetermined temperature change, the shape of the region, and the movement of the region, the object and the location thereof, and thereby can determine that this object is a telephone. In the same way, in a case where the sensing system 1 acquires a thermal image such as illustrated in FIG. 7B, the sensing system 1 determines, from the region in the thermal image in FIG. 7B exhibiting a predetermined temperature change, the shape of the region, and the movement of the region, the object and the location thereof, and thereby can determine that this object is an air cleaner. In the same way again, in a case where the sensing system 1 acquires a thermal image such as illustrated in FIG. 7C, the sensing system 1 determines, from the region in the thermal image in FIG. 7C exhibiting a predetermined temperature change, the shape of the region, and the movement of the region, the object and the location thereof, and thereby can determine that this object is a television set.

Comprehending Location and Operating State of Appliance in Object Space

The sensing system 1 can identify objects and the locations thereof in the object space based on thermal images, and determine the state of the objects. Appliances which use electric power generate heat, so the sensing system 1 can determine from change in temperature in the thermal image, the shape of the region, and so forth, that the object is an appliance, and can also determine the type of appliance. Accordingly, the sensing system 1 can comprehend running appliances and the locations thereof in the object space such as a room, for example.

Accordingly, the sensing system 1 can notify the user in a case where the user has forgotten to turn of an appliance. That is to say, the sensing system 1 can also be used to confirm or prevent appliances from being left on.

The sensing system 1 also may estimate the power consumption of each appliance from the temperature and size of the object (appliance). In this case, the sensing system 1 may transmit to the user a notification promoting energy-conserving activities.

Note that the sensing system 1 may acquire a history of power consumption for each type of appliance, by communicating with a cloud or the like. In this case, the sensing system 1 can comprehend the appliances running in the object space and the locations thereof (appliance map) with higher precision. Once an appliance map is established, higher-level inter-appliance collaboration (collaboration among an air conditioner, humidifier, and fan, in the same room, for example) can be realized.

Value of Showing Image

The sensing system 1 also may display a thermal image where determination results of type and so forth of the appliances have been added. Accordingly, not only can the user readily comprehend which appliances are running (emitting heat), but also can tell which appliances have been inadvertently left on. In a case where the sensing system 1 notifies the user away from home to that effect, the user can comprehend which appliances have been left on while away from home.

The sensing system 1 can also calculate the approximate power consumption of each appliance, based on the temperature and size of the appliances in the thermal image, and accordingly may notify the user of the approximate calculation results. Thus, the user can implement effective power conservation measures.

The sensing system 1 also can determine abnormalities at the appliances (locations where electricity is leaking, such as arc tracking), and accordingly may notify the user of the results. Accordingly, the user can comprehend appliances with abnormal heating, and can take measures regarding the abnormal heating.

Advantages of First Embodiment

According to the first embodiment, a sensing method and sensing system, and an air conditioning device having the same, capable of improving precision of recognition, can be realized. Note that the sensing method and sensing system, and air conditioning device having the same, can identify people based on thermal images, and further determine locations of the people, so as to comprehend spaces through which people can travel, and thus can comprehend the layout of the object space. Accordingly, operations can be performed corresponding to the layout of the object space which has been comprehended, such as performing air conditioning more suitable for the object space which has been comprehended.

Second Embodiment

Configuration of Sensing System

Figure 8:
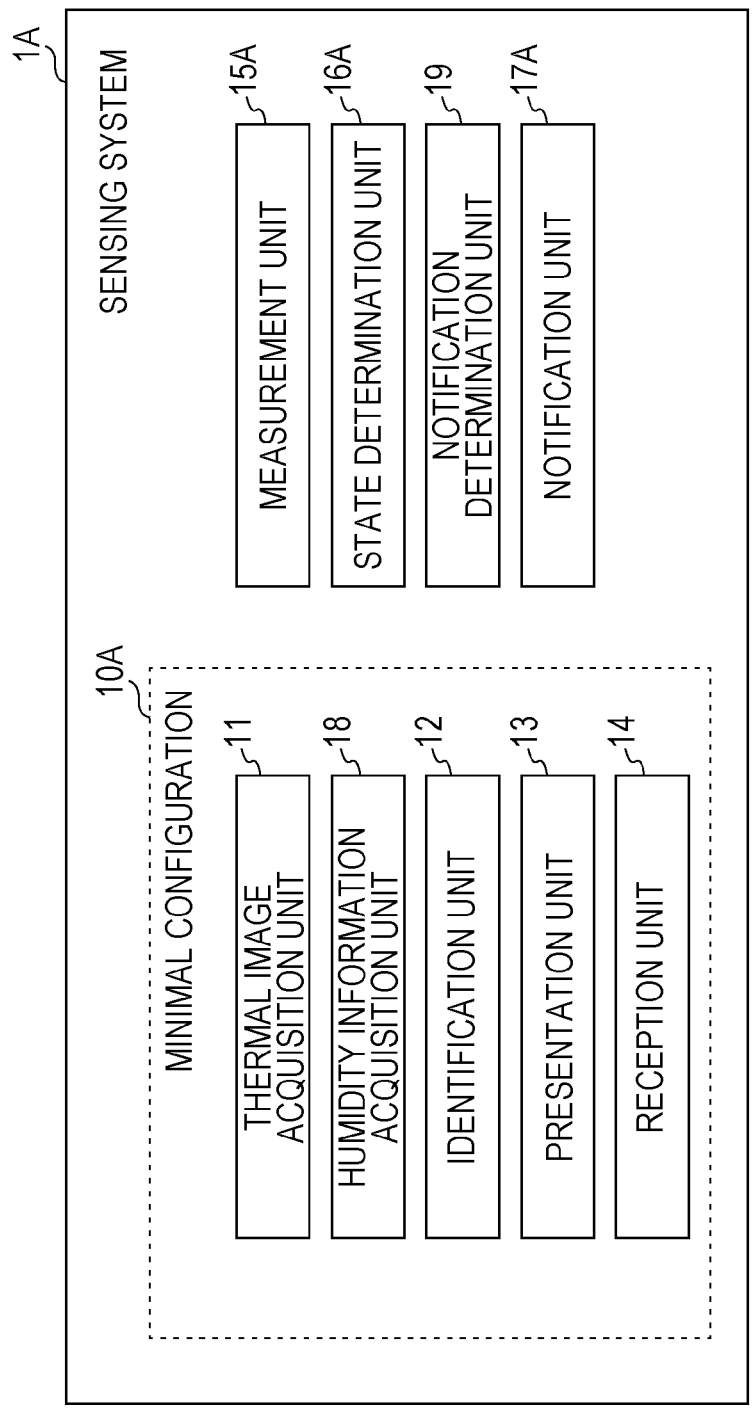
FIG. 8 is a diagram illustrating an example of a configuration of a sensing system according to a second embodiment.
Figure 9:
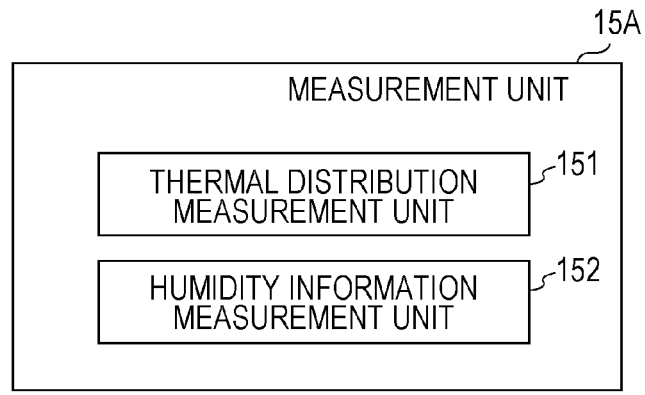
FIG. 9 is a diagram illustrating an example of a detailed configuration of a measurement unit in the second embodiment.

A sensing system according to a second embodiment will be described with reference to the drawings. FIG. 8 is a diagram illustrating an example of a configuration of a sensing system 1A according to a second embodiment, and FIG. 9 is a diagram illustrating an example of a detailed configuration of a measurement unit 15A in the second embodiment. Components which are the same as those in FIG. 1 are denoted by the same reference numerals, and detailed description thereof will be omitted.

The sensing system 1A illustrated in FIG. 8 is different from the sensing system 1 in the first embodiment with regard to the point that a notification determination unit 19 has been added, and that the configurations of a minimal configuration 10A and a measurement unit 15A differ from those of the minimal configuration 10 and measurement unit 15, respectively. The minimal configuration 10A illustrated in FIG. 8 differs from the minimal configuration 10 illustrated in FIG. 1 with regard to the point that a humidity information acquisition unit 18 has been added. The humidity information acquisition unit 18 acquires information of humidity in the object space. The notification determination unit 19 determines whether or not there is notification information of which the user should be notified.

The state determination unit 16A determines the state of the object space including objects identified by the identification unit 12, based on the thermal image and humidity information. The state determination unit 16A may determine a location in the object space where condensation is likely to occur, or may determine a location in the object space where heat is escaping, or may determine the lifestyle of the user, as described later in Example 1 and Example 2. The lifestyle of the user may be the location of laundry hung up to dry in the room and the state of dryness thereof, or may be the content of meals of the user.

In a case where determination is made by the notification determination unit 19 that there is notification information, the notification unit 17A notifies the user of this notification information. For example, the notification unit 17A may notify the user of lifestyle improvement proposal information as the notification information, based on the thermal distribution and humidity distribution. The notification information may be a location in the object space where condensation is likely to occur, a location in the object space where heat is escaping, or measures to prevent condensation or heat escape from occurring, as described later in Example 1 and Example 2. The notification unit 17A may also notify the air conditioner of control commands and so forth to control the air environment in the object space, as notification information.

The measurement unit 15A measures thermal distribution of the object space, and outputs as a thermal image. The measurement unit 15A according to the present embodiment includes a thermal distribution measurement unit 151 and a humidity information measurement unit 152, as illustrated in FIG. 9.

The thermal distribution measurement unit 151 measures the thermal distribution in the object space and outputs as the thermal image.

The humidity information measurement unit 152 measures the humidity in the object space, and calculates the humidity distribution of the object space based on the measured humidity and the thermal distribution expressed in the thermal image acquired by the thermal image acquisition unit 11. The humidity information of the object space may be the humidity distribution of the object space or may be the humidity of the object space.

Operations of Sensing System

Figure 10:
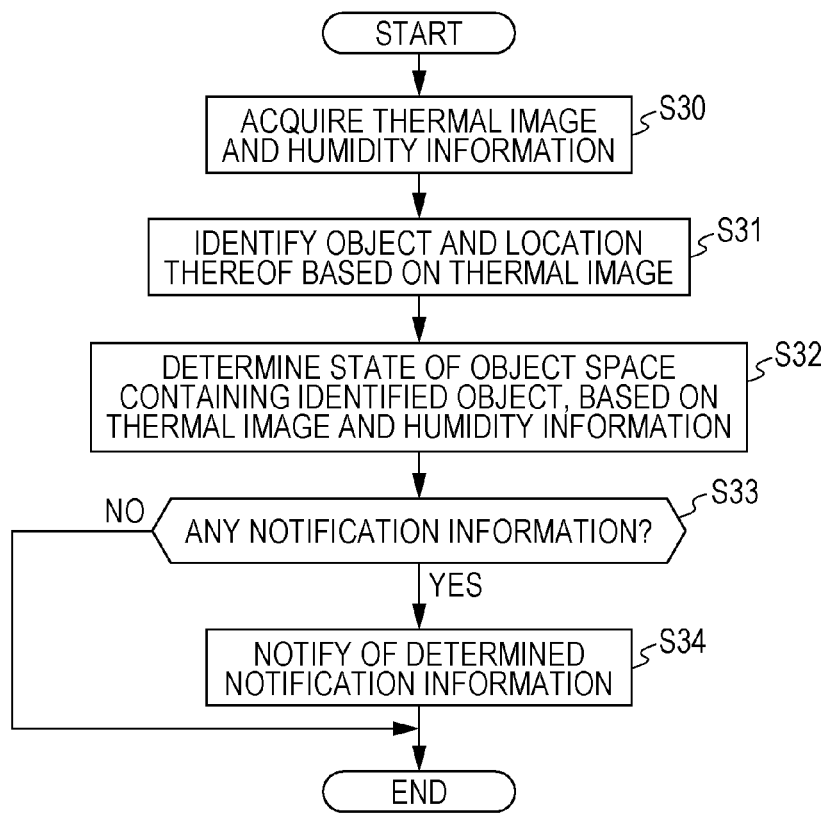
FIG. 10 is a flowchart illustrating an example of operations of the sensing system according to the second embodiment.

Next, the operations of the sensing system 1A configured as described above will be described. FIG. 10 is a flowchart illustrating an example of operations of the sensing system 1A according to the second embodiment.

First, the sensing system 1A acquires a thermal image and humidity information of an object space (S30).

Next, the sensing system 1A identifies an object included in the object space in the thermal image acquired in S30, and identifies the location of the object, based on this thermal image (S31).

The sensing system 1A then determines the state of the object space including the object identified in S31, based on this thermal image and the humidity information (S32).

The sensing system 1A thereafter determines whether or not there is notification information which should be notified to the user (S33). In a case where there is notification information in S33 which should be notified to the user (YES in S33), the sensing system 1A notifies the user of the notification information determined in S33 (S34). On the other hand, in a case where there is no notification information in S33 which should be notified to the user (NO in S33), the sensing system 1A ends the flow.

The following is a description of an example of operations of the sensing system 1A illustrated in FIG. 10, by way of Examples 1 and 2.

Example 1: Showing User Thermal Distribution in Room and Prompting Improved Lifestyle An example of lifestyle improvement proposal information notified based on humidity information and thermal distribution on the thermal image will be described in Example 1.

Figure 11:
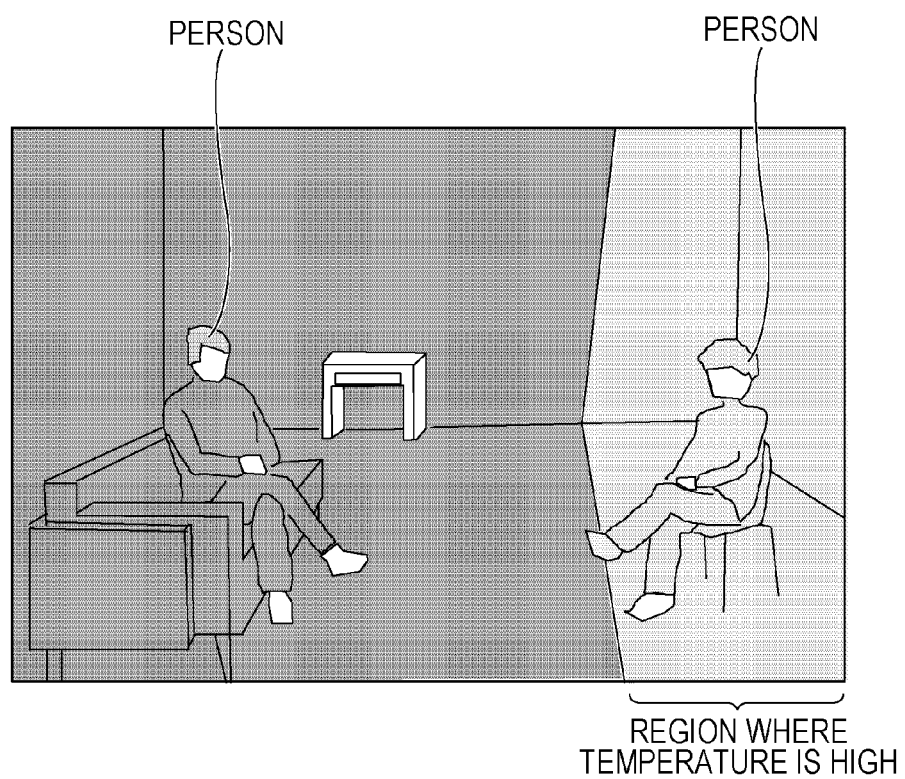
FIG. 11 is an illustrative drawing of a thermal image in an Example 1 of the second embodiment.

FIG. 11 is an illustrative drawing of an example of a thermal image in Example 1 of the second embodiment. The thermal image in FIG. 11 shows thermal distribution in a simplified manner.

In a case of having acquired a thermal image such as illustrated in FIG. 11, the sensing system 1A can determine objects and locations thereof from regions indicating a predetermined temperature range in the thermal image illustrated in FIG. 11, shapes of the regions, and movement of the regions, and can determine that the objects are people. The sensing system 1A can also determine a relatively high temperature region in the thermal image illustrated in FIG. 11 (the high temperature region in FIG. 11).

The sensing system 1A may superimpose the information "mildew risk" on the thermal image at portions which might exhibit condensation during winter months, to be notified to the user as lifestyle improvement proposal information. The sensing system 1A can calculate the relative humidity at each location using a hygrometer and a radiation thermometer, and accordingly can determine locations where condensation might occur, from the humidity information and temperature distribution measured by the measurement unit 15A. The sensing system 1A may then notify the user of lifestyle improvement proposal information, indicating portions in the thermal image where the relative humidity is near 100% (e.g., 90%), or the like.

The air conditioner having the sensing system 1A can also determine that location where the temperature is high when cooling (and locations where the temperature is low when heating) are exhibiting heat leakage. In this case, the sensing system 1A may notify the user of "heat leak spots" or prompt the user to undertake insulating measures, as lifestyle improvement proposal information.

The air conditioner having the sensing system 1A may calculate the insulation performance of each of the walls or the like, from a thermometer provided to an outside unit of the air conditioner and from wall temperatures in the room, and determine the insulation performance level (a relative value as compared with other houses) for the room (object space). In this case, the sensing system 1A notifies the heat leak spots identified from the shapes and location information in the thermal image, as lifestyle improvement proposal information. Examples of lifestyle improvement proposal information notified to the user may include "Heat escaping from window", "Please close curtains", or "Double-pane windows recommended".

In a case where the air conditioner having the sensing system 1A can determine based on the thermal image that the walls and floor in wintertime are colder than the room temperature, the heat can be turned up, and if there is a person at a location where the wall or floor of the room is cold, warm air can be sent in that direction.

Figure 12A:
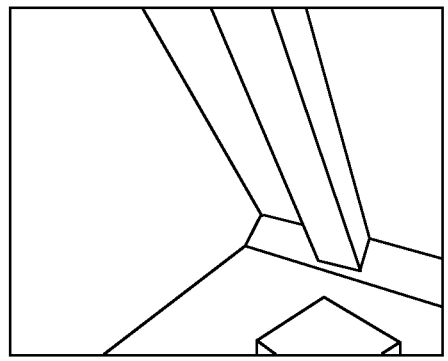
FIG. 12A is an illustrative drawing of a visible-light image in Example 1 of the second embodiment.
Figure 12B:
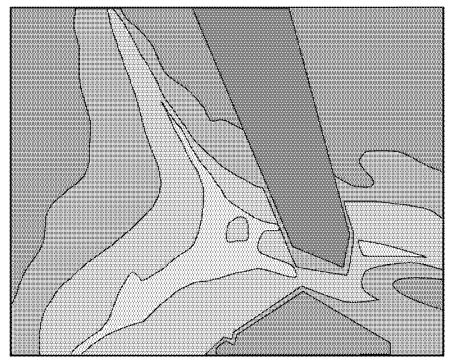
FIG. 12B is an illustrative drawing of a thermal image in Example 1 of the second embodiment.

Now, a case of notifying the user of mildew risk as lifestyle improvement proposal information will be described. FIG. 12A is an illustrative drawing of a visible-light image in Example 1 of the second embodiment, and FIG. 12B is an illustrative drawing of a thermal image in the same. The thermal image in FIG. 12B shows thermal distribution in a simplified manner.

That is to say, the air conditioner having the sensing system 1A can determine the humidity distribution at the planes of the walls, floor, and window sides, from humidity information from the humidity sensor (humidity information measurement unit 152) installed in the indoor unit of the air conditioner, and from the thermal image in FIG. 12B. Accordingly, the air conditioner having the sensing system 1A can warn (notify) detection (determination) of condensation in the room (object space). In the example illustrated in FIGS. 12A and 12B, the left corner of the room (object space) is starting to show signs of condensation. Accordingly, the air conditioner having the sensing system 1A may notify the user with lifestyle improvement proposal information such as "Condensation is starting at the left corner of the room (object space). Shall I dehumidify it?" for example.

The air conditioner having the sensing system 1A may further notify the user of the thermal image with the identification results added. Confirming the temperature distribution of the object space makes it easier for the user to accept the lifestyle improvement proposal. For example, if the temperature difference between window side portions of the object space (room) and other portions thereof is too great, the sensing system 1A may notify lifestyle improvement proposal information, such as giving a mildew risk warning due to condensation, recommend dehumidifying, and recommending curtains or double-pane windows.

Example 2: Examples of Operations According to Lifestyle

Examples of operations according to lifestyles will be described in Example 2, as examples of operations of the air conditioner having the sensing system 1A. Operations other than the hot/cold sensation estimation described in Example 1 will be described in Example 2. The air conditioner having the sensing system 1A may determine the lifestyle of the user from the thermal distribution in the thermal image, and operate according to the determined lifestyle.

Air Conditioning According to Location of Laundry Hung Indoors to Dry, and the State of Dryness The sensing system 1A may control dehumidifying breeze from the air conditioner while determining the location and state of dryness of laundry hung up in the room to dry, for example. Accordingly, the sensing system 1A can realize functions of drying laundry.

Air Conditioning According to Meals of User

The sensing system 1A may comprehend (determine) what the user is eating, from the thermal distribution of the thermal image and so forth, and control the air conditioner accordingly, for example. For example, if the user is cooking in the room using a large cauldron, the room may be filled with hot steam, so the sensing system 1A may control the air conditioning so that the heat is turned down. If the user is using an indoor grill and the sensing system 1A determines that the room is filled with smoke, a cleaning robot which cleans the filter of the indoor unit of the air conditioner may be notified so as to be turned on.

In a case where the sensing system 1A determines that the user is having a meal, from thermal distribution in the thermal image and so forth, air conditioning may be controlled so that breeze is avoided from blowing on the table.

Air Conditioning According to TV Viewing

The sensing system 1A can comprehend whether the user is viewing television or not, from the thermal distribution in the thermal image and so forth, and accordingly may control the air conditioning of the air conditioner so that the breeze is gentle (the air conditioning is quiet) while the user is viewing television. If the sensing system 1A can acquire the program contents of the TV program which the user is viewing, the air conditioning of the air conditioner may be controlled according to the program contents.

Advantages of Second Embodiment

According to the present embodiment, a sensing method and sensing system, and an air conditioning device having the same, capable of improving precision of recognition, can be realized. Also, according to the present embodiment, an air conditioner having the sensing system 1A, capable of controlling air conditioning based on thermal distribution and humidity information, can be realized.

Third Embodiment

Configuration of Sensing System

Figure 13:
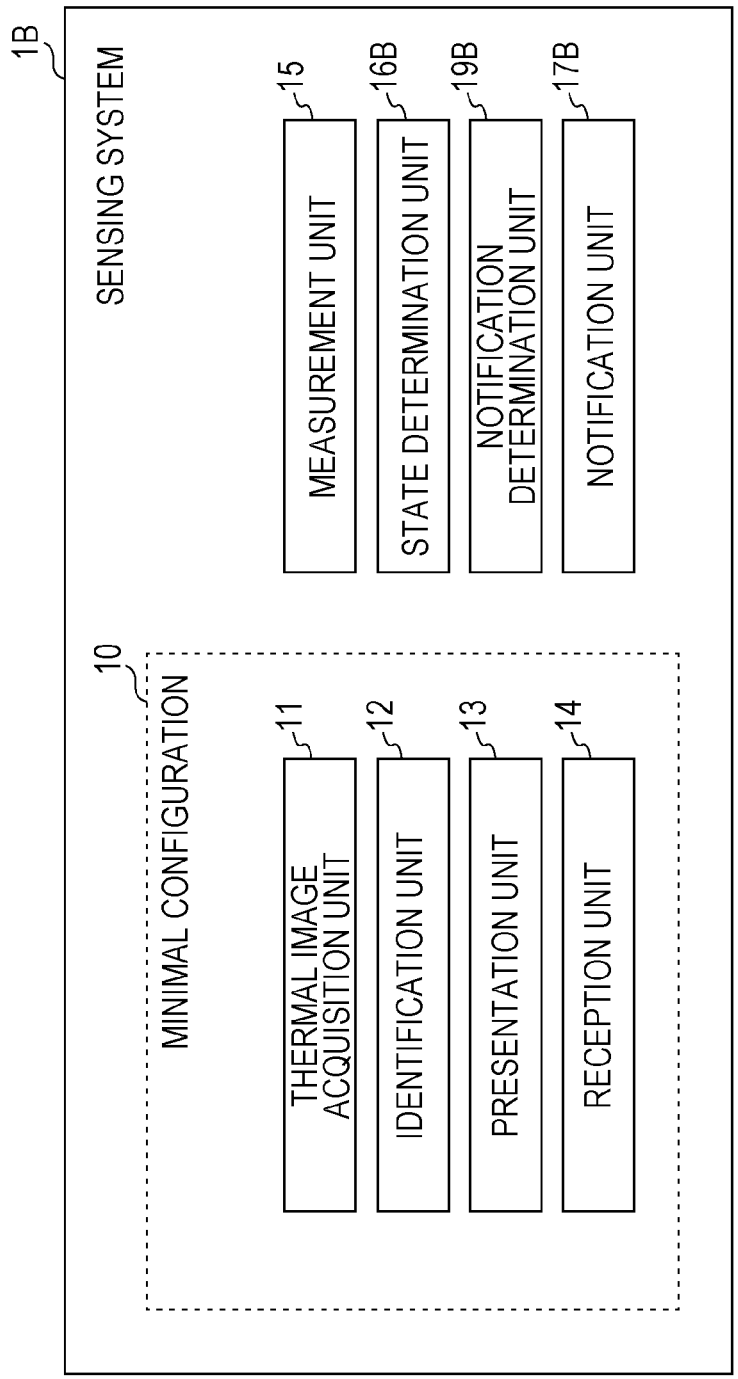
FIG. 13 is a diagram illustrating an example of a configuration of a sensing system according to a third embodiment.

A sensing system according to a third embodiment will be described with reference to the drawings. FIG. 13 is a diagram illustrating an example of a configuration of a sensing system 1B according to the third embodiment. Components which are the same as those in FIGS. 1 and 8 are denoted by the same reference numerals, and detailed description thereof will be omitted.

The sensing system 1B illustrated in FIG. 13 differs from the sensing system 1 according to the first embodiment in that a notification determination unit 19B has been added, and that the configurations of a state determination unit 16B and notification unit 17B differ from those of the state determination unit 16 and notification unit 17, respectively.

The state determination unit 16B determines the state of the object identified by the identification unit 12, based on the thermal image. The state determination unit 16B may determine (detect) a state where an intruder is in the object space for example, or may determine (detect) a state where a person has fallen in the object space, or may determine that a person has left a bed in the object space, or the like, as described later in Example 1 and Example 2.

The notification determination unit 19B determines whether or not there is information which should be notified to the user, based on the state of an object determined by the state determination unit 16. In a case where the notification determination unit 19B has determined that there is notification information, the notification unit 17B notifies the user of this notification information. The notification unit 17B may notify the user using the thermal image to which the determination results from the state determination unit 16 have been added, the determination results alone, or the thermal image alone, as the notification information. Alternatively, the notification unit 17B may notify the user to the effect that there is an intruder in the object space, that there is a person in the object space who has fallen, that a person has left the bed in the object space, or the like, as the notification information, as described later in Example 1 and Example 2.

Operations of Sensing System

Figure 14:
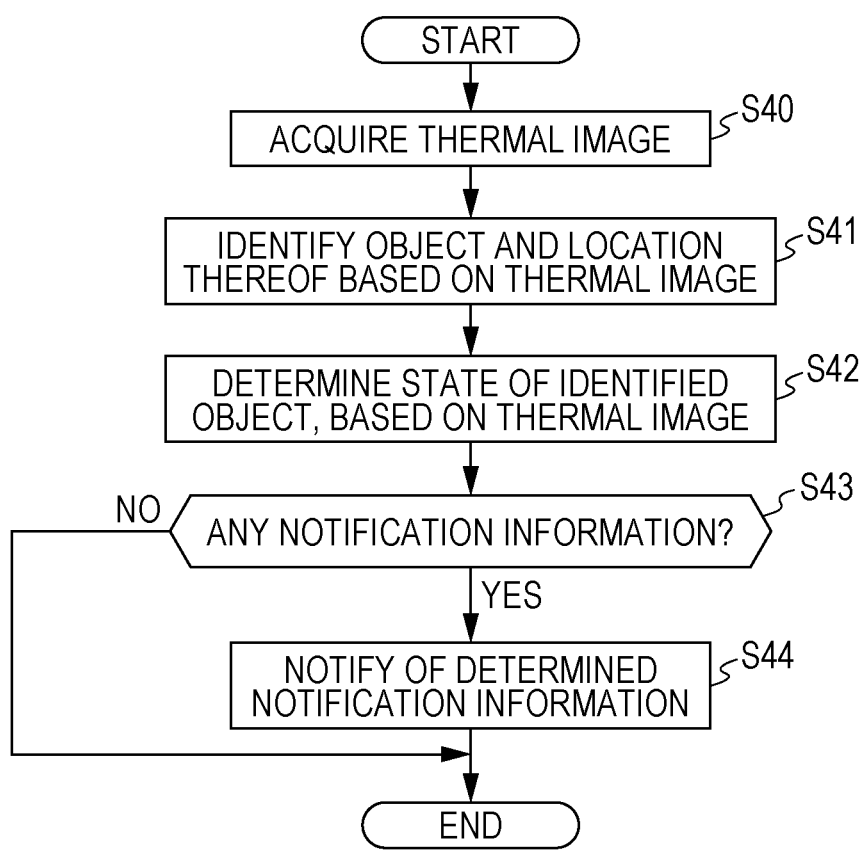
FIG. 14 is a flowchart illustrating an example of operations of the sensing system according to the third embodiment.

Next, the operations of the sensing system 1B configured as described above will be described. FIG. 14 is a flowchart illustrating an example of operations of the sensing system 1B according to the third embodiment.

First, the sensing system 1B acquires a thermal image of an object space (S40).

Next, the sensing system 1B identifies an object included in the object space in the thermal image acquired in S40, and identifies the location of the object, based on this thermal image (S41).

The sensing system 1B then determines the state of the object space including the object identified in S41, based on this thermal image (S42).

The sensing system 1B thereafter determines whether or not there is notification information which should be notified to the user (S43). In a case where there is notification information in S43 which should be notified to the user (YES in S43), the sensing system 1B notifies the user of the notification information determined in S43 (S44). On the other hand, in a case where there is no notification information in S43 which should be notified to the user (NO in S43), the sensing system 1B ends the flow.

The following is a description of an example of operations of the sensing system 1B illustrated in FIG. 14, by way of Examples 1 through 3.

Example 1: Monitoring for Home Security

An example of operations of the sensing system 1B detecting an intruder and making notification will be described in Example 1. Currently, primarily pyroelectric sensors are used as home security sensors. However, pyroelectric sensors have problems in that erroneous detection often occurs, and the site has to be checked each time for naught. Examples of causes of erroneous detection by pyroelectric sensors include not being able to distinguish between pets and humans, detecting temperature change due to remote air conditioner operations, detecting heat generated by a facsimile device printing an incoming fax, and so forth.

On the other hand, if a thermal image sensor can be used as a home security sensor, detection (determination) can be made between whether a pet, heat generated by an appliance, or an intruder, depending on the shape, size, and speed of motion in the thermal image. That is to say, the state of the object space in the home or the like can be confirmed from thermal images. Accordingly, using the sensing system 1B enables an intruder to be detected (determined) while the user is away from home, using thermal images.

In a case where an intruder is detected (determined) while the user is away from home, using thermal images, the sensing system 1B can notify a security company that an intruder has been detected. The sensing system 1B may notify the security company by a thermal image to which determination results have been added, as a material for determination. In this case, the security company can confirm the thermal image to judge whether there actually is an intruder, or a pet or the like of the user has been erroneously detected (determined).

In a case where an intruder is detected (determined) while the user is away from home, the sensing system 1B may notify the user that an intruder has been detected, for example. The sensing system 1B may notify the user by a thermal image to which determination results have been added, as a material for determination.

While description has been made of notifying the user or security company by a thermal image to which determination results have been added, the sensing system 1B is not restricted to this, and may make notification using the thermal image alone as information for determination. The method of the sensing system 1B judging whether or not there is no one at home is not restricted to using a thermal image. For example, this may be registered to the sensing system 1B by the user pressing an away-from-home mode button, or the sensing system 1B may pass judgment using location information of a mobile terminal of the user such as a smartphone.

Example 2: Monitoring by Detecting Fallen Person

Next, examples of operations of the sensing system 1B in a case of detecting a fallen person will be described in Example 2.

Detection of Fallen Person in Disaster

Figure 15:
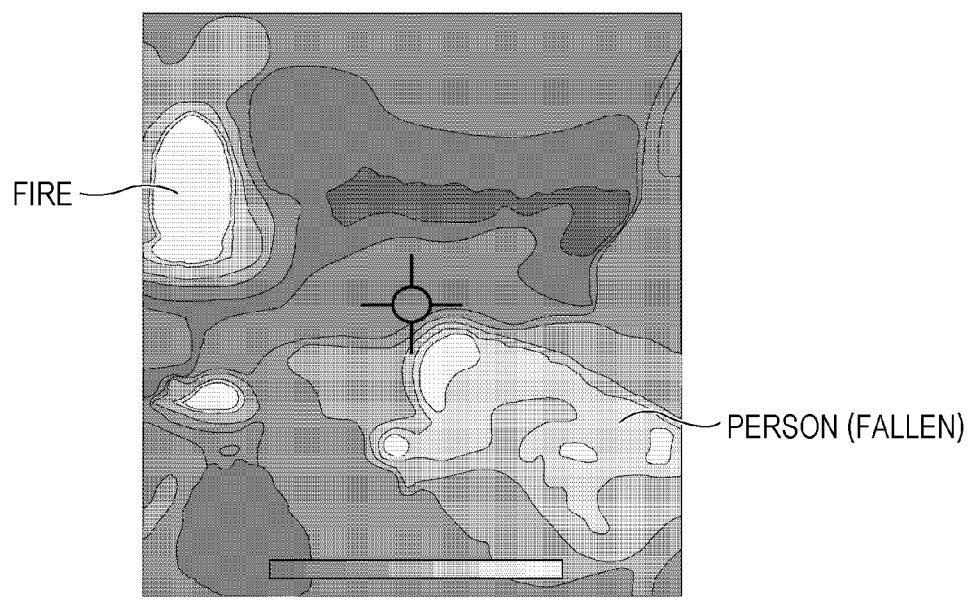
FIG. 15 is an illustrative drawing of a thermal image in an Example 2 of the third embodiment.

FIG. 15 is an illustrative drawing of a thermal image in Example 2 of the third embodiment. The thermal image in FIG. 15 shows thermal distribution in a simplified manner.

In a case of having acquired a thermal image such as illustrated in FIG. 15, the sensing system 1B can determine the object and the location thereof from a region exhibiting a predetermined temperature range, the shape of the region, and the movement of the region in the thermal image in FIG. 15. In the thermal image in FIG. 15, a fire and a fallen person can be detected (determined).

Thus, in a case of detecting (determining) a fire and a fallen person, the sensing system 1B can notify a security company or the like to the effect that a disaster has occurred and that there is a person who requires rescuing.

Detection of Fallen Elderly

Figure 16A:
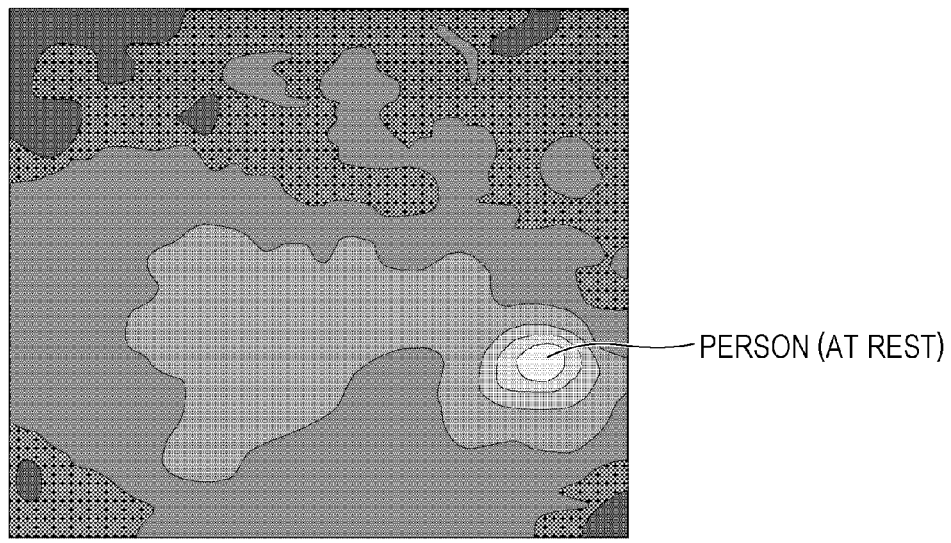
FIGS. 16A and 16B are illustrative drawings of thermal images in Example 2 of the third embodiment.
Figure 16B:
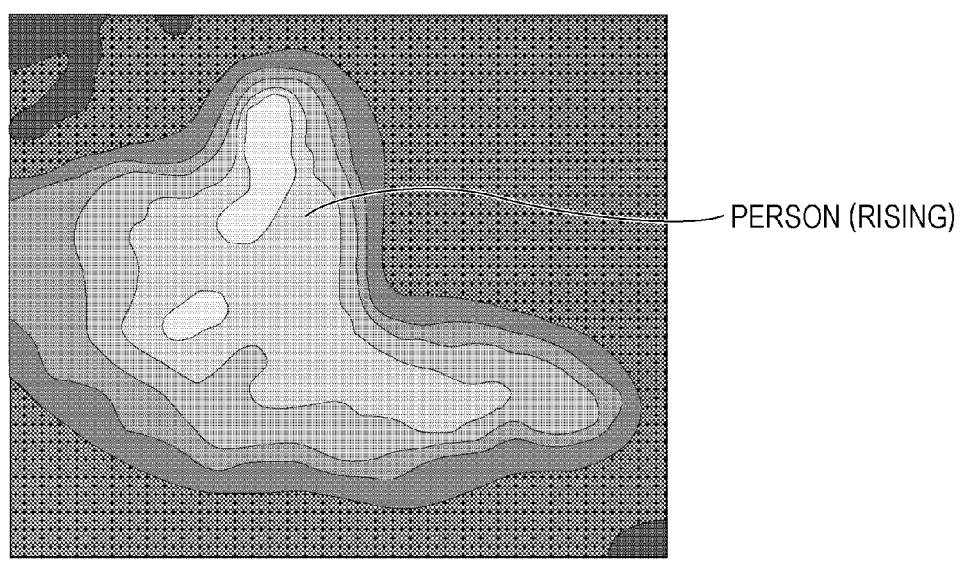

FIGS. 16A and 16B are illustrative drawings of thermal images in Example 2 of the third embodiment. The thermal images in FIGS. 16A and 16B show thermal distribution in a simplified manner.

In a case of having acquired thermal images such as illustrated in FIG. 16A or 16B, the sensing system 1B can determine the object and the location thereof from a region exhibiting a predetermined temperature range, the shape of the region, and the movement of the region from the thermal images in FIGS. 16A and 16B. In the thermal image in FIG. 16A, a person who is at rest can be determined, and in the thermal image in FIG. 16B, a person who is arising can be determined.

Thus, the sensing system 1B can determine an elderly person rising and leaving the bed, and so forth, for example. In this case, the sensing system 1B may notify the family or a caretaker (if in care of such) by the thermal image with determination results added. Accordingly, the user (caretaker, family, etc.) can view the thermal image with the determination results added thereto, and can judge whether or not the determination results of the sensing system 1B are erroneous. Thus, the location where the elderly person is does not need to be visited for confirmation regarding falling or wandering each time a notice arrives.

The precision of the sensing system 1B recognizing thermal images can be improved by registering information regarding objects, such as setting the region of the bed used by the elderly person in the thermal image, and so forth.

Modification
Configuration of Sensing System

Figure 17:
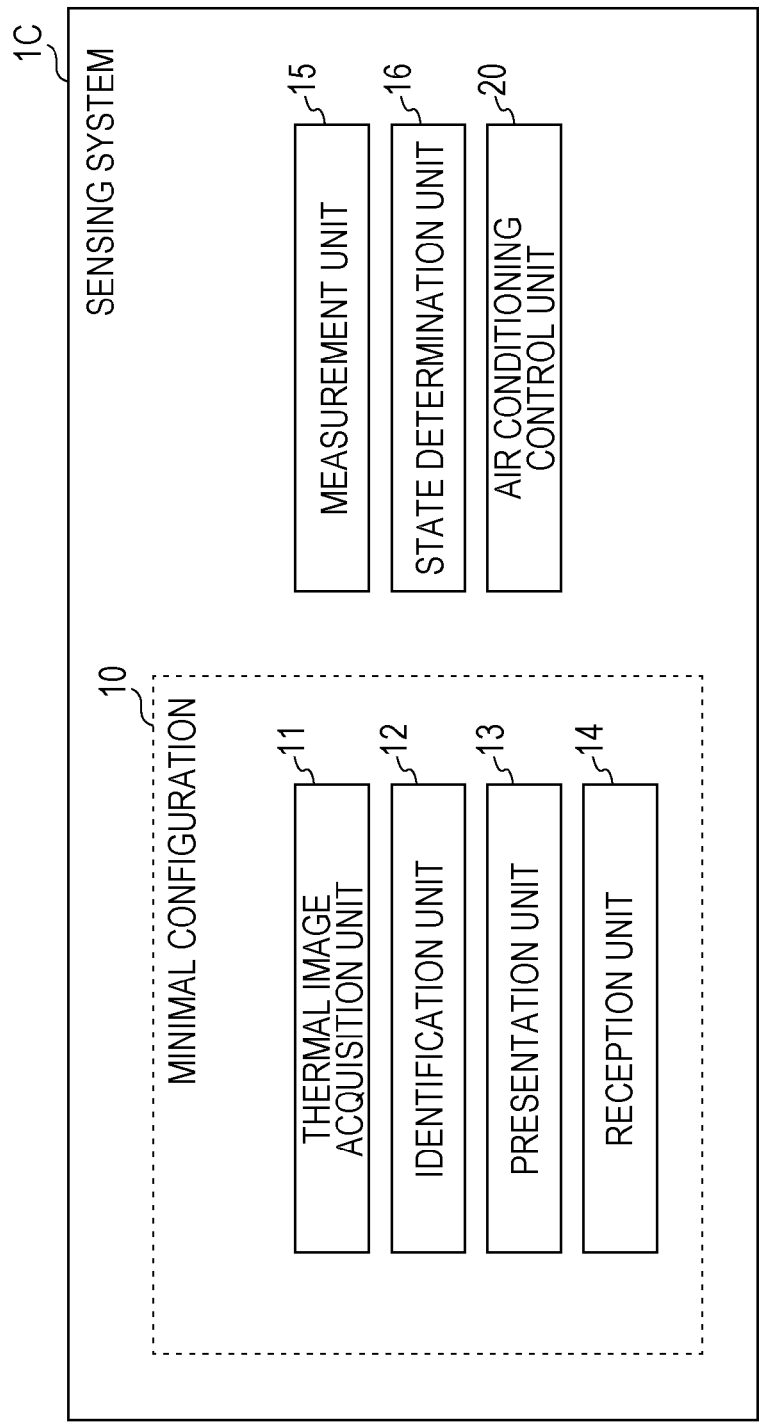
FIG. 17 is a diagram illustrating an example of a configuration of a sensing system according to a modification of the third embodiment.

A sensing system according to a modification of the third embodiment will be described with reference to the drawings. FIG. 17 is a diagram illustrating an example of a configuration of a sensing system 1C according to a modification of the third embodiment. Components which are the same as those in FIGS. 1 and 13 are denoted by the same reference numerals, and detailed description thereof will be omitted.

The sensing system 1C illustrated in FIG. 17 differs from the sensing system 1 according to the first embodiment in that an air conditioning control unit 20 has been added. The air conditioning control unit 20 controls the air environment in the object space based on the state of the object determined by the state determination unit 16. The term "air environment" as used here includes at least one of temperature, humidity, wind speed, and direction of wind in the object space.

Note that the sensing system 1C may acquire humidity information of the object space. In this case, the air conditioning control unit 20 controls the air environment of the object space based on the state of the object determined by the state determination unit 16, and the humidity information.

Operations of Sensing System

Figure 18:
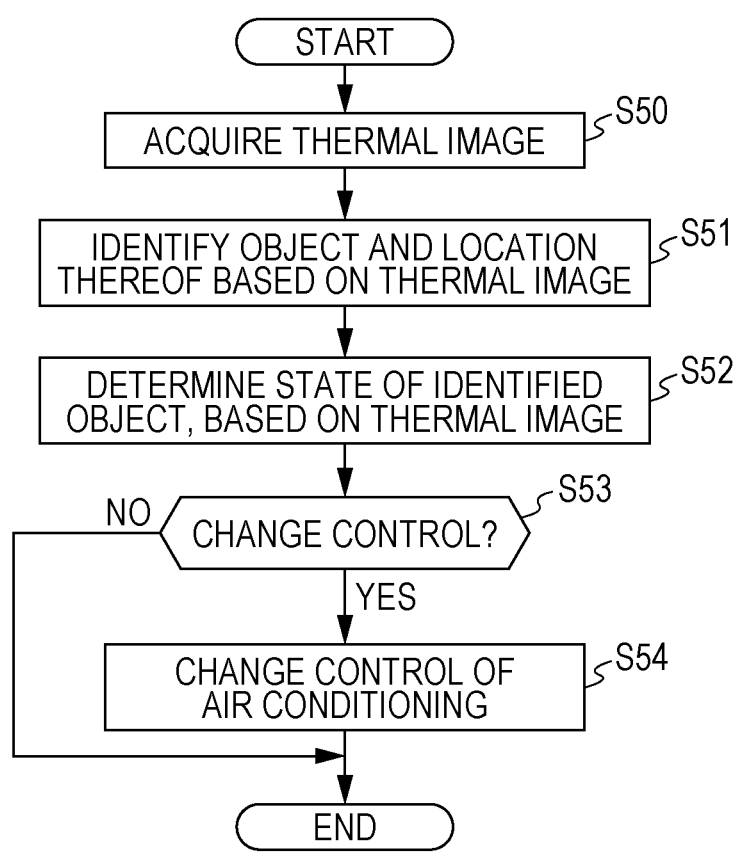
FIG. 18 is a flowchart illustrating an example of operations of the sensing system according to the modification of the third embodiment.

Next, the operations of the sensing system 1C configured as described above will be described. FIG. 18 is a flowchart illustrating an example of operations of the sensing system 1C according to the modification of the third embodiment.

First, the sensing system 1C acquires a thermal image of an object space (S50).

Next, the sensing system 1C identifies objects included in the object space in the thermal image acquired in S50, and identifies the locations of the objects, based on this thermal image (S51). The object may be a heat source or a person in the object space for example, and may be a child or an elderly person, or may be blankets or pajamas the user uses when sleeping, or may be parts of the body of the user (feet, head, etc.), as described later in Example 3 through Example 6. Further, the object may be laundry for example, as described later in Example 3 through Example 6.

The sensing system 1C then determines the state of the objects identified in S51, based on this thermal image (S52). Note that as described later in Example 3 through Example 6, the state of the object may be, for example, a distance between a heat source in the object space and a person, or may be risk of heat stroke based on the surface temperature of a person, or may be a state of blankets having come off while sleeping or how pajamas are being worn, or may be a sleeping position of the user. The state of the objects may be positions and actions of a person, or may be activity amount of a person, or may be the amount of clothing the user is wearing, or may be a state of dryness of laundry.

The sensing system 1C thereafter determines whether or not there is a need to change control of the air environment in the object space (S53), based on the state of the object determined by the state determination unit 16. In a case where there is a need to change control of the air environment in the object space in S53 (YES in S53), the sensing system 1C changes control of the air environment in the object space (S54). On the other hand, in a case where there is no need to change control of the air environment in the object space in S53 (NO in S53), the sensing system 1C ends the flow.

The following is a description of examples of operations of the sensing system 1C illustrated in FIG. 18, by way of Examples 3 through 6.

Example 3: Monitoring Air Conditioner

Figure 19:
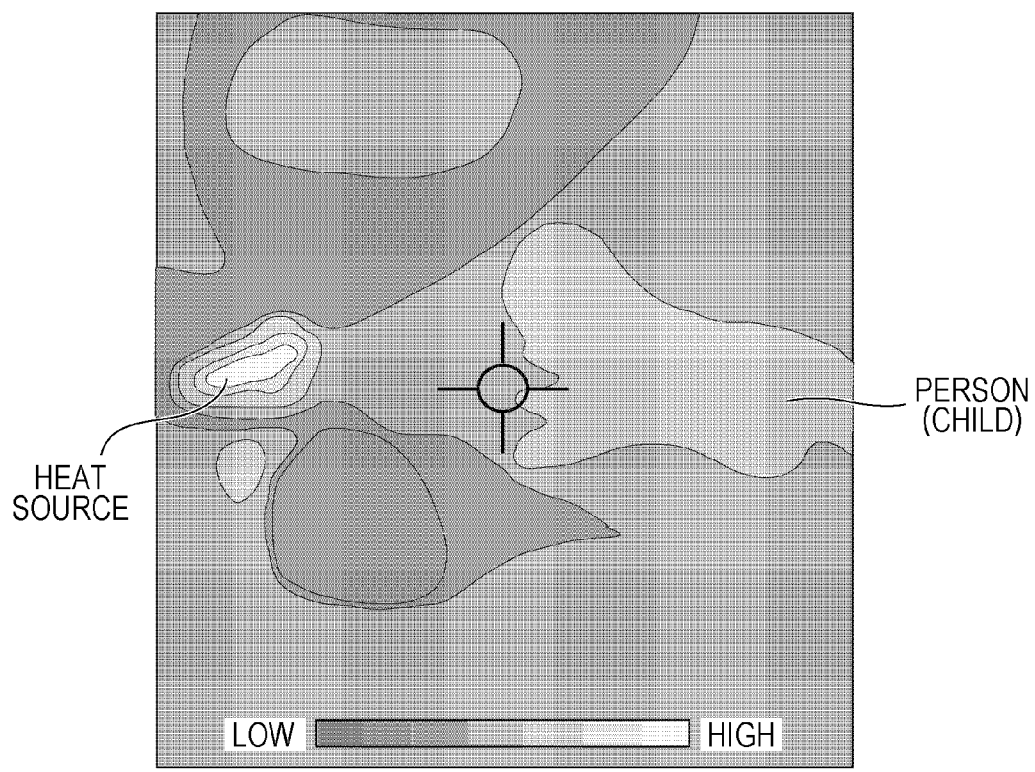
FIG. 19 is an illustrative drawing of a thermal image in an Example 3 of the third embodiment.

In Example 3, an example of the operations of an air conditioner having the sensing system 1C detecting a child or an elderly person and protecting from heat stroke or burns will be described. FIG. 19 is an illustrative drawing of a thermal image in Example 3 of the third embodiment. The thermal image in FIG. 19 shows thermal distribution in a simplified manner.

In a case of having acquired a thermal image such as illustrated in FIG. 19, the sensing system 1C can determine the object and the location thereof from a region exhibiting a predetermined temperature range, the shape of the region, and the movement of the region from the thermal images in FIG. 19. In the thermal image in FIG. 19, a heat source and a person (child) can be detected (determined).

The sensing system 1C may detect (determine) a heat source and person (child), and make a notification to the effect of giving a warning to the person (child) if the person (child) gets near to the heat source, for example. An alarm may be set to a large volume to serve as a notification to the effect of giving a warning if a person (parent) is not in the object space (same room). Thus, the sensing system 1C can detect the person (child) and heat source, and perform operations to avoid danger (prevent burns).

In a case of having detected a person (child) or a person (elderly), the sensing system 1C may further determine the surface temperature of the person (state of the object), based on the thermal image. Accordingly, the sensing system 1C can perform operations to prevent heat stroke of the person (child) or a person (elderly).

Example 4: Sound-Sleep Air Conditioner

Description will be made in Example 4 regarding examples of operations of an air conditioner (good-sleep air conditioner) having the sensing system 1C, as an example of operations according to lifestyle.

Air Conditioning According to State of Blankets Coming Off During Sleep and State of Wearing Pajamas The sensing system 1C may control the air conditioning performed by the air conditioner while determining the state of blankets coming off during sleep, and the state of how the user is wearing pajamas, for example, based on the thermal image. For example, in a case where of determining that the user has removed the blankets while asleep, the sensing system 1C may effect control to turn up the heat in the air conditioning being performed by the air conditioner.

Air Conditioning According to Body Surface Temperature and Sleeping Position (Feet, Head)

The sensing system 1C may control the air conditioning performed by the air conditioner while determining the body surface temperature of the user and the sleeping position (feet, head), based on the thermal image. For example, the sensing system 1C may control the air conditioning based on the determination results of the user regarding the sleeping position (feet, head), so as to avoid blowing breeze on the head of the user, or may control the air conditioning based on the determination results of the surface temperature of the user, so that the body temperature of the user does not become too low (prevention of air conditioning sickness).

Air Conditioning According to Gestures

The sensing system 1C can detect (determine) the location of a person and the state and actions of the person, even in complete darkness, by using the thermal distribution of the thermal image. Accordingly, the air conditioning performed by the air conditioner may be controlled according to the detected results. For example, the sensing system 1C may determine gestures made by the user in a dark bedroom (object space) and control the air conditioning being performed by the air conditioner according to the determination results thereof. That is to say, the sensing system 1C may function as a dark-room remote controller which can be controlled by user gestures, using the thermal distribution of the thermal image. Thus, the sensing system 1C can control the air conditioner according to the lifestyle of the user, by sensing the lifestyle of the user from the thermal distribution in the room.

Note that the sensing system 1C may determine the user turning during sleep, and determine the body surface temperature, by using the thermal distribution in the thermal image, and control the air conditioning being performed by the air conditioner based on a history of these. The sensing system 1C may also notify the user with beauty/health related advice based on the history of these, such as "This week is your detox cycle. Avoid stimulants and take care of your skin." or the like.

Example 5: Air Conditioning According to State of Person

An example of operations of the air conditioner having the sensing system 1C will be described in Example 5, as an example of operations according to the state of a person. Note that an example will be described in Example 5 which is different from the operations based on the hot/cold sensation estimation described in Example 1.

Air Conditioning According to Heat Source

In a case of determining that the user is near a heat source, as the state of the user, the sensing system 1C may control the air conditioning being performed by the air conditioner according to the results of this determination. For example, in a case of determining that the user is near a heat source, such as ironing, cooking, or the like, the sensing system 1C may control the air conditioner so as to make the air colder (or suppress heating).

Air Conditioning According to Individual

The sensing system 1C may determine preferences of individual users as the state of the user, and control the air conditioning being performed by the air conditioner according to the determination results. For example, in a case of having determined that Mr. A, who tends to set the room temperature high with the air conditioner, is in the object space, the sensing system 1C may control the air conditioner to make the heating stronger, or may identify individual users and control the air conditioner to reproduce a preferred room temperature.

Air Conditioning According to Activity Amount

Upon detecting the amount of activity of the user as the state of the user, the sensing system 1C may control the air conditioning being performed by the air conditioner according to the determination results thereof.

Air Conditioning According to People with Different Body Temperature in Object Space Upon detecting people with different body temperatures in the object space, as the state of the user, the sensing system 1C may control the air conditioning being performed by the air conditioner according to the determination results thereof. For example, if detecting people with different body temperatures in the object space, the sensing system 1C may control the air conditioning being performed by the air conditioner so that warm air is directed toward a person with low body temperature, for example. The sensing system 1C may also determine from the body temperature of people with different body temperatures whether each person is cold-natured or hot-natured, or chronically cold, and control the air conditioning being performed by the air conditioner based on the determination results so that each person feels comfortable.

Air Conditioning According to Amount of Clothing

The sensing system 1C may determine the amount of clothing which the user is wearing, as the state of the user, and control the air conditioning being performed by the air conditioner according to the determination results thereof. For example, upon detecting that the user is only wearing underwear, or just a dress shirt, based on the room temperature and the thermal distribution of the user, the sensing system 1C may control the air conditioning being performed by the air conditioner, such as making the heating or cooling stronger, so that the user feels comfortable. Note that the amount of clothing of the user may be calculated from the surface thermal distribution of the user. Generally, the more clothes a person is wearing, the closer the surface temperature of the clothing is to the room temperature, so the amount of clothing can be calculated from the temperature difference between the surface temperature of the clothing, room temperature, and body temperature.

Example 6: Dryness State Checker

The sensing system 1C may confirm (determine) the dryness state of laundry hung up in the object space to dry, and notify the user when dry. Wet laundry is robbed of surface vaporization heat and accordingly is around 5° C. cooler than the room temperature (although this depends on the humidity and wind speed). As the laundry progressively dries, the difference in temperature of the laundry and the room temperature closes. Accordingly, the sensing system 1C can determine the state of dryness based on the thermal image, and can notify that drying is complete. The sensing system 1C can also distinguish between portions of the laundry which dry quicker and which dry slower, and accordingly may adjust the direction of the breeze to blow toward portions which are drying slower (pants and shirt sleeves, pockets, etc.).

Advantages of Third Embodiment

According to the present embodiment, a sensing method and sensing system, and an air conditioning device having the same, capable of improving precision of recognition, can be realized. Also, according to the present embodiment, an air conditioner having the sensing system 1B, capable of controlling air conditioning based on thermal distribution, can be realized.

Fourth Embodiment

Configuration of Sensing System

Figure 20:
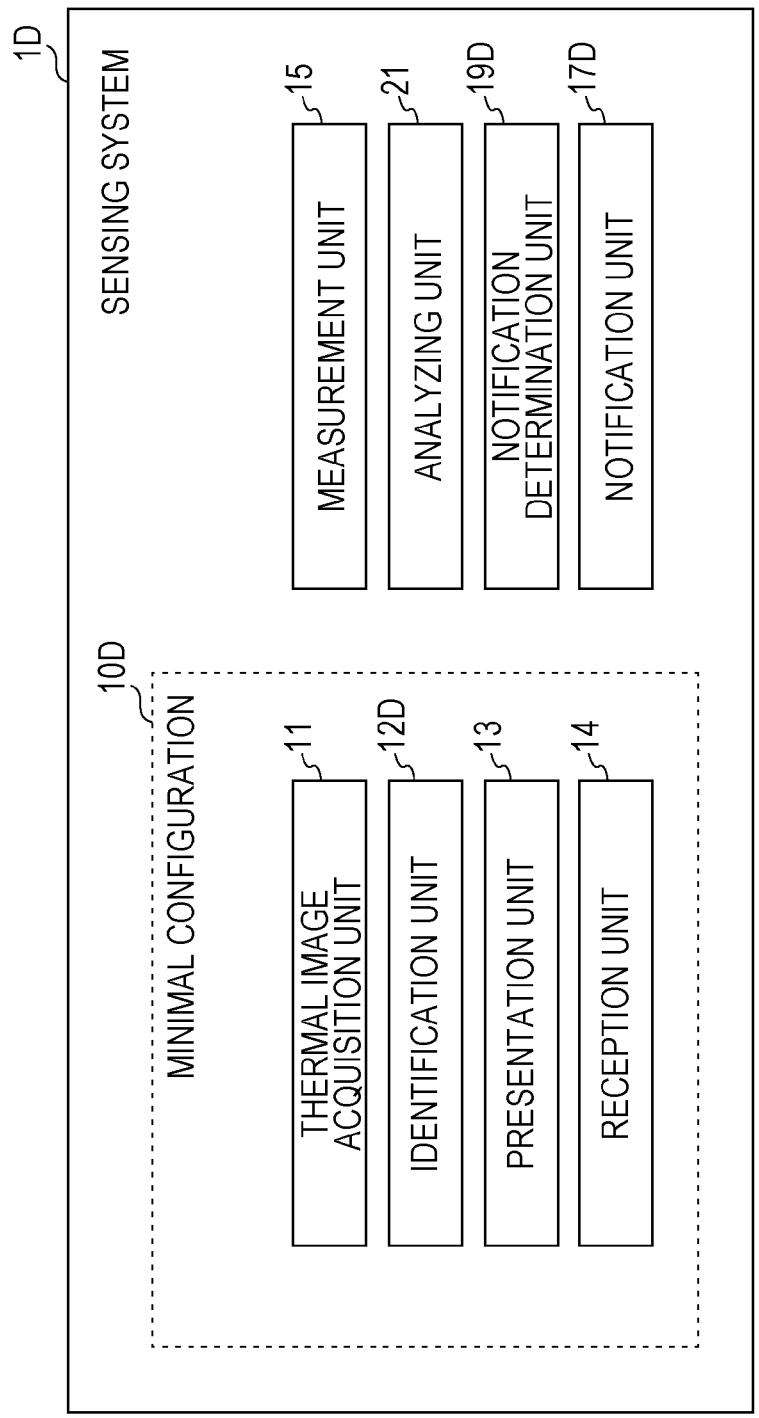
FIG. 20 is a diagram illustrating an example of a configuration of a sensing system according to a fourth embodiment.
Figure 21:
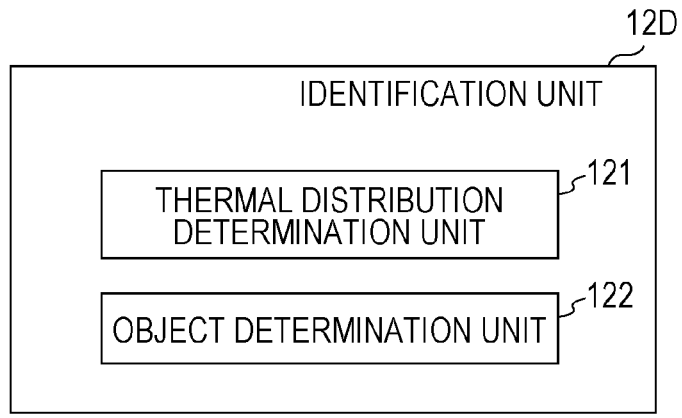
FIG. 21 is a diagram illustrating an example of a detailed configuration of an identification unit in the fourth embodiment.

A sensing system according to a fourth embodiment will be described with reference to the drawings. FIG. 20 is a diagram illustrating an example of a configuration of a sensing system 1D according to a fourth embodiment. FIG. 21 is a diagram illustrating an example of a detailed configuration of an identification unit 12D in the fourth embodiment. Components which are the same as those in FIGS. 1 and 8 and so forth are denoted by the same reference numerals, and detailed description thereof will be omitted.

The sensing system 1D illustrated in FIG. 20 differs from the sensing system 1 according to the first embodiment in that the state determination unit 16 has been omitted, a notification determination unit 19D and analyzing unit 21 have been added, and that the configurations of an identification unit 12D and a notification unit 17D differ from those of the identification unit 12 and the notification unit 17, respectively.

Based on thermal images acquired by the thermal image acquisition unit 11, the identification unit 12D identifies objects in the object space included in the thermal images. The identification unit 12D according to the present embodiment includes a thermal distribution determination unit 121 and object determination unit 122, as illustrated in FIG. 21, for example. The thermal distribution determination unit 121 and object determination unit 122 are the same as those described in the first embodiment, and accordingly description will be omitted here.

Based on thermal images acquired by the thermal image acquisition unit 11, the analyzing unit 21 analyzes objects identified by the identification unit 12D. Note that the analyzing unit 21 may analyze the daily sleep state of the user, or may analyze the body fat of the user, or may analyze whether the clothing of the user is suitable for the physical condition of the user that day and the weather outside, for example, as described later by way of Example 1 through Example 3. Also, the analyzing unit 21 may analyze the thermal distribution of the face of the user to confirm dryness, age spots, or wrinkles, or may analyze the type of chronic coldness, for example, as described later by way of Example 4 and Example 5.

The notification determination unit 19D determines whether or not there is information which should be notified to the user, based on results of analysis by the analyzing unit 21. In a case where the notification determination unit 19D has determined that there is notification information, the notification unit 17D notifies the user of this notification information. The notification unit 17D may notify the user of the analysis results of the analyzing unit 21, or may notify of the acquired thermal image, or may notify using the thermal image to which the analysis results have been added, as the notification information, for example. The notification unit 17D may notify the user of lifestyle improvement proposal information, as notification information to the user. For example, this may be recommendation for facial muscle exercises, or may be a proposal for a better sleep environment, which will be described later.

Operations of Sensing System

Figure 22:
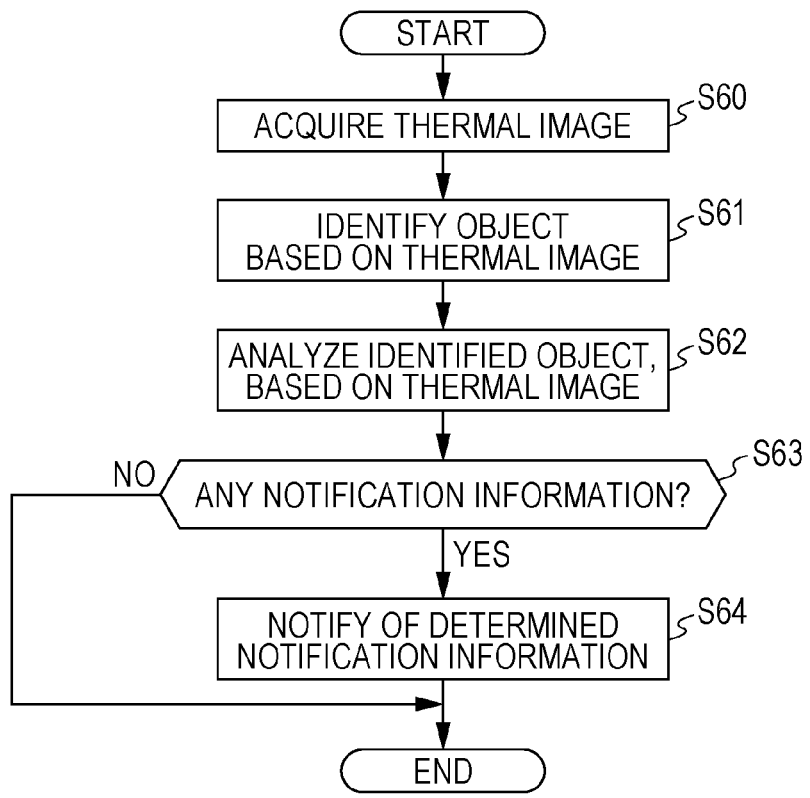
FIG. 22 is a flowchart illustrating an example of operations of the sensing system according to the fourth embodiment.

Next, the operations of the sensing system 1D configured as described above will be described. FIG. 22 is a flowchart illustrating an example of operations of the sensing system 1D according to the fourth embodiment.

First, the sensing system 1D acquires a thermal image of an object space (S60).

Next, the sensing system 1D identifies an object included in the object space in the thermal image acquired in S60, and identifies the location of the object, based on this thermal image (S61).

The sensing system 1D then analyzes the object identified in S61, based on this thermal image (S62).

The sensing system 1D thereafter determines whether or not there is notification information which should be notified to the user, based on the analysis results of the analyzing unit 21 (S63). In a case where there is notification information in S63 which should be notified to the user (YES in S63), the sensing system 1D notifies the user of the notification information determined in S63 (S64). On the other hand, in a case where there is no notification information in S63 which should be notified to the user (NO in S63), the sensing system 1D ends the flow.

The following is a description of an example of operations of the sensing system 1D illustrated in FIG. 22, by way of Examples 1 through 5.

Example 1: Health Air Conditioner

Example 1 illustrates an example of operations of the air conditioner (health air conditioner) having the sensing system 1D. For example, the air conditioner (health air conditioner) having the sensing system 1D may measure (analyze) the daily sleep state of the user, and notify of lifestyle improvement proposal information. Items (sleep state) which can be measured (analyzed) based on thermal images include sleep time, depth of sleep (REM/non-REM), change in body temperature during sleep, number of times of turning and frequency and time zone thereof, blankets coming off, basal body temperature, and so forth.

The sensing system 1D can notify the user with lifestyle improvement proposal information by visualizing the daily sleep state (history of items which can be measured) in a graph, and presenting this to the user. The sensing system 1D may notifying the user with lifestyle improvement proposal information such as "Skin tends to become dry this time of the year. Avoid long baths, and keep room humidity high." for example. Body temperature change due to sleep rhythm has been confirmed, so the user may be presented with proposals for better sleep environment (lifestyle improvement proposal information), based on biological information which can be acquired from thermal images, such as body temperature change and body movement.

Example 2: Measurement of Body Fat

Figure 23:
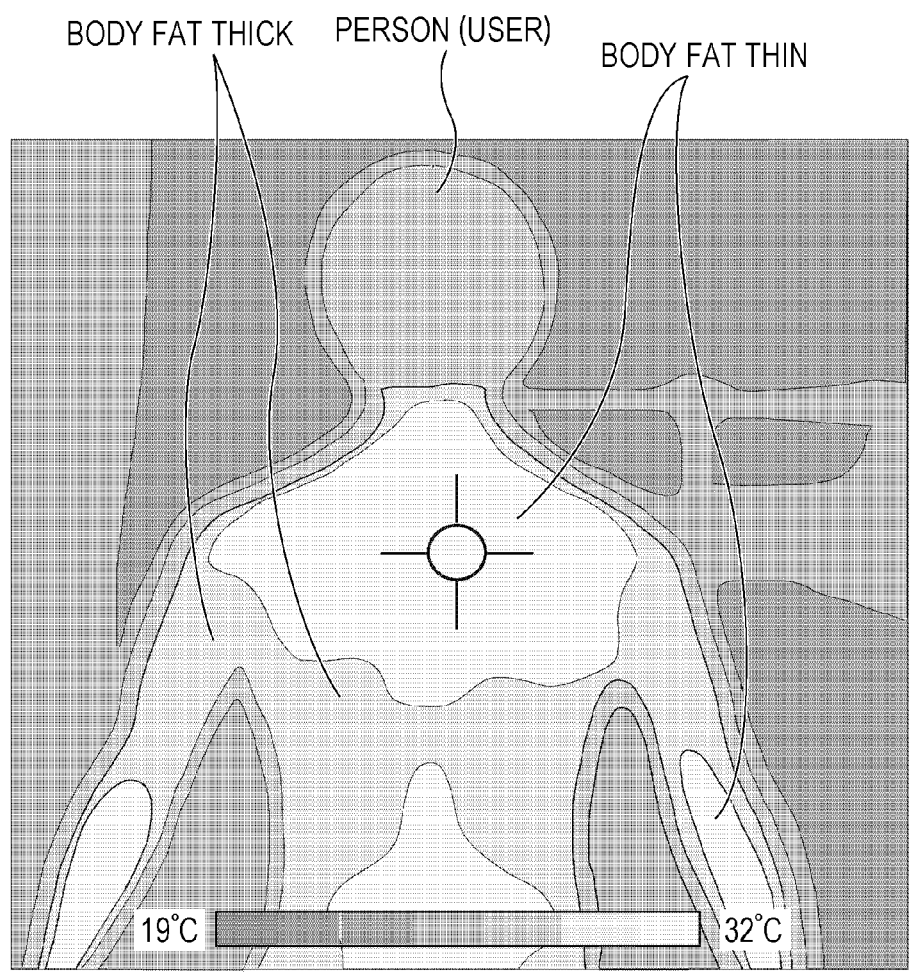
FIG. 23 is an illustrative drawing of a thermal image in an Example 2 of the fourth embodiment.

An example of operations the sensing system 1D measuring body fat of the user using thermal images will be described in Example 2. FIG. 23 is an illustrative drawing of a thermal image in Example 2 of the fourth embodiment. The thermal image in FIG. 23 shows thermal distribution in a simplified manner.

The sensing system 1D can measure (analyze) body fat of a person by acquiring a thermal image such as illustrated in FIG. 23, and in a case of determining that the object is a person, analyze the thermal distribution of that person. Fat does not readily conduct heat, so the fat thickness distribution of the entire body can be measured based on the temperature of the body surface (in the nude). The portions in a thermal image of a person where the fat is thick will show up as low-temperature portions, and portions where fat is thin as high-temperature portions. Accordingly, the sensing system 1D may notify the user with a thermal image to which estimated fat thickness at each portion has been superimposed (added) so as to give the user a sense of crisis to diet, and prompt lifestyle improvements.

Example 3: Clothing Check Before Leaving Home

Figure 24:
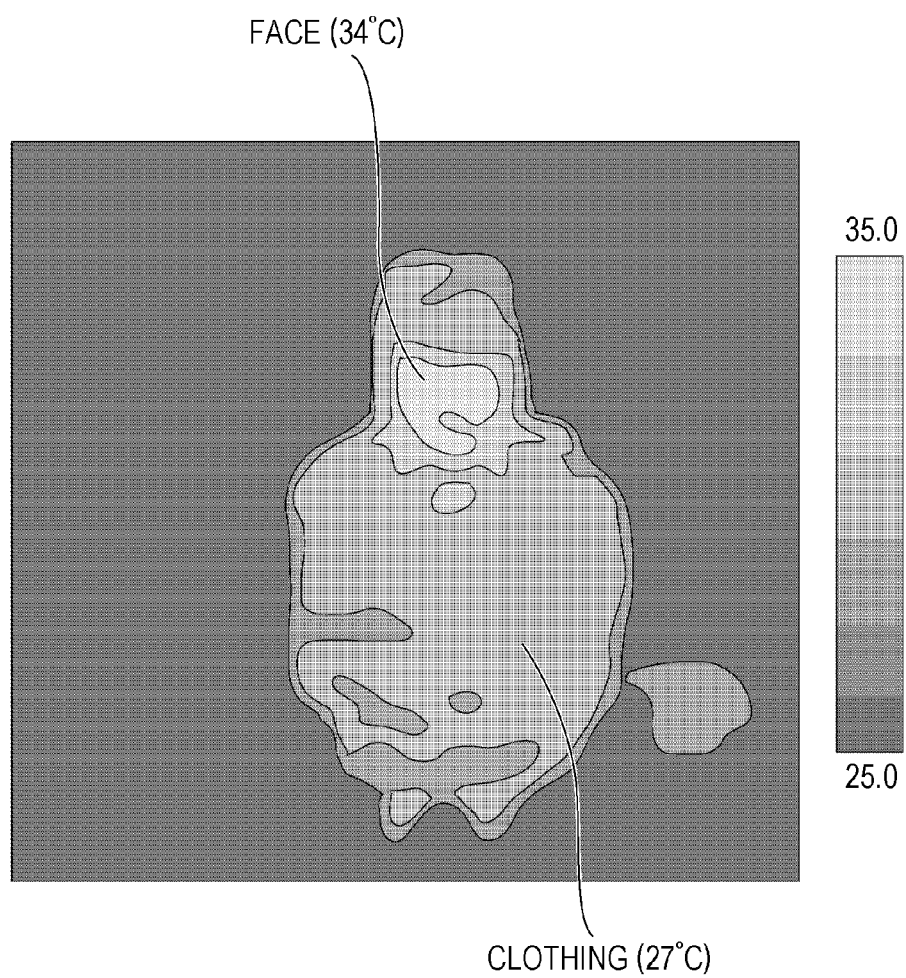
FIG. 24 is an illustrative drawing of a thermal image in an Example 3 of the fourth embodiment.

An example of operations the sensing system 1D performing a clothing check of the user using thermal images will be described in Example 3. FIG. 24 is an illustrative drawing of a thermal image in Example 3 of the fourth embodiment. The thermal image in FIG. 23 shows thermal distribution in a simplified manner.

The sensing system 1D acquires a thermal image such as illustrated in FIG. 24, and in a case of determining that the object is a person (user), analyzes the thermal distribution of that person (user). Accordingly, the sensing system 1D can confirm (analyze) whether the body conditions and clothing of the user that day are suitable for the temperature outdoors, and can notify the user of the confirmation results. The temperature outdoors can be acquired from a cloud with which the sensing system 1D can communicate, and the body temperature of the user can be estimated (analyzed) from the facial temperature in the thermal image. The amount of clothing of the user can be acquired by calculating the amount of clothing (amount of insulation) from the surface temperature of the clothing.

For example, the sensing system 1D may notify the user with confirmation information such as "The weather at this certain region today is fair, the low for today is 6° C., and the high is 14° C. Your current clothing amount is 1.2 clo (where "clo" is a unit of clothing amount), so you may want to put on one more garment." Alternatively, the sensing system 1D might notify the user that "Your current body temperature is 37.1° C. You may have a cold, so take care."

Example 4: Facial Check and Beauty Tips

Figure 25:
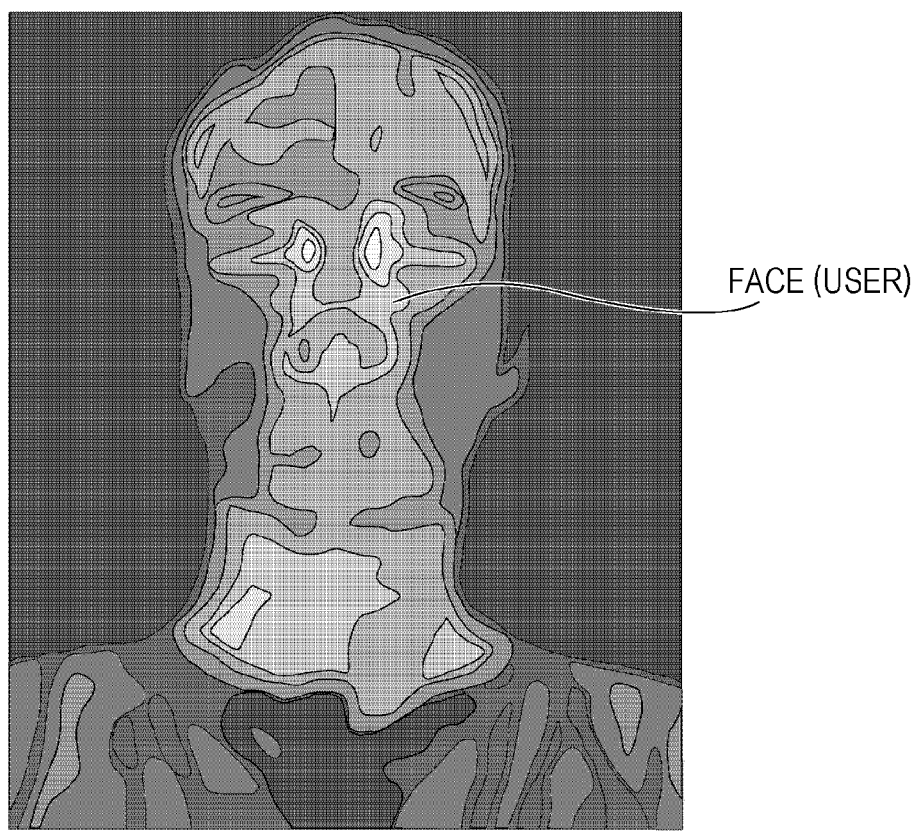
FIG. 25 is an illustrative drawing of a thermal image in an Example 4 of the fourth embodiment.

An example of operations the sensing system 1D performing a facial check of the user and giving beauty tips, using thermal images, will be described in Example 4. FIG. 25 is an illustrative drawing of a thermal image in Example 4 of the fourth embodiment. The thermal image in FIG. 25 shows thermal distribution in a simplified manner. The measurement unit 15 of the sensing system 1D according to the present embodiment is capable of measuring a fine thermal distribution at a distance of 1 m or so to the user, and thus can analyze the facial thermal distribution of the user with high precision.

The sensing system 1D acquires a thermal image such as illustrated in FIG. 25, and in a case of determining that the object is a face of a person (user), analyzes the thermal distribution of the face that person. Accordingly, the sensing system 1D can confirm dryness, age spots, or wrinkles of the user, and can notify the user of the confirmation results. For example, in a case where the face has been analyzed as being low temperature based on the thermal image of the face of the user, the sensing system 1D can notify the user that blood flow is poor, and that this can lead to facial dryness, age spots, and wrinkles.

Also, in a case of analyzing that the temperature of the cheeks is low based on the thermal image of the face of the user, the sensing system 1D may notify the user of lifestyle improvement proposal information as the confirmation results. The lifestyle improvement proposal information may be such as "Cheek muscle exercises recommended" or "Risk of age spots and wrinkles". The sensing system 1D may also notify the user of information relating to facial muscle exercises as lifestyle improvement proposal information. Further, the sensing system 1D may analyze the temperature distribution in the face of the user, and notify the user when the entire face is the ideal temperature (34° C.).

Thus, the user can confirm the thermal image to which the confirmation results notified by the sensing system 1D have been added. Accordingly, the user can confirm with his/her own eyes the portions which need exercise, can clearly see the effects of improved blood flow due to thermal creams, cosmetics, and facial massagers, and can select products which are appropriate for him/herself.

Example 5: Diagnosis of Chronic Coldness

An example of the sensing system 1D diagnosing (analyzing) the type of chronic coldness of the user using thermal images will be described in Example 5. The measurement unit 15 of the sensing system 1D can diagnose (analyze) the type of chronic coldness of the user by measuring the thermal distribution of the user at a distance of around 2 m from the user. The sensing system 1D may then add the diagnosis results to the thermal image and notify the user.

Examples of diagnosis results may include "Your chronic coldness is due to low internal organ temperature (hidden chronic coldness). Please keep your abdomen warm and eat ginger and the like to raise your inner body temperature." and "Your chronic coldness is due to constriction of blood vessels at your extremities. Hot-water/cold-water stimulation and massaging your hands and feet is recommended." for example.

Thus, the user can confirm the thermal image to which the diagnosis results notified by the sensing system 1D have been added. Accordingly, the user can tell which body portions are cold, and further can be convinced by the diagnosis results. Moreover, using the sensing system 1D enables the user to compare thermal images before and after massaging, and thus the user can confirm the effects of countering chronic coldness by massaging. Using the sensing system 1D also enables the user to diagnosis the severity of chronic coldness of his/her own body, either directly or using an application or the like which is executed in the mobile terminal of the user.

Advantages of Fourth Embodiment

According to the present embodiment, a sensing method and sensing system, and an air conditioning device having the same, capable of improving precision of recognition, can be realized.

Note that the sensing system according to the fourth embodiment is not restricted to the arrangement illustrated in FIG. 20. Another configuration of the sensing system according to the fourth embodiment will be described with reference to the drawings.

Figure 26:
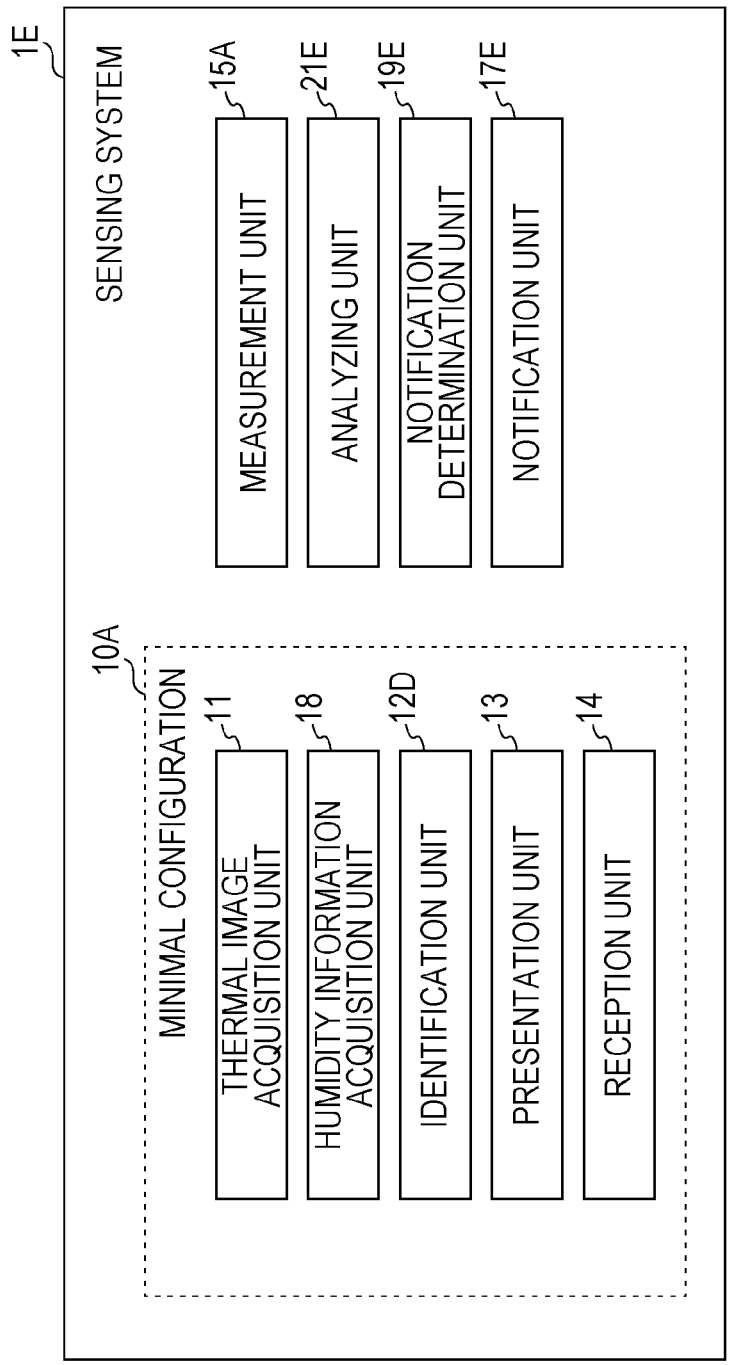
FIG. 26 is a diagram illustrating another example of a configuration of a sensing system according to the fourth embodiment.

FIG. 26 is a diagram illustrating an example of a configuration of a sensing system 1E according to the fourth embodiment. Components which are the same as those in FIGS. 1, 8, and 20 are denoted by the same reference numerals, and detailed description thereof will be omitted.

The sensing system 1E illustrated in FIG. 26 differs from the sensing system 1D illustrated in FIG. 20 in that the humidity information acquisition unit 18 has been added, and that the configurations of a measurement unit 15A, analyzing unit 21E, notification determination unit 19E, and notification unit 17E differ from those of the measurement unit 15, analyzing unit 21, notification determination unit 19D, and notification unit 17D, respectively.

In this configuration, the humidity information acquisition unit 18 acquires humidity information of the object space. The analyzing unit 21E analyzes the state of the object identified by the identification unit 12D, based on the thermal image acquired by the thermal image acquisition unit 11 and the humidity information acquired by the humidity information acquisition unit 18. The notification determination unit 19E determines whether or not there is information which should be notified to the user, based on the analysis results by the analyzing unit 21E. In a case where determination is made by the notification determination unit 19E that there is notification information, the notification unit 17E notifies this notification information to the user.

Fifth Embodiment: Additional Embodiment

Description will be made regarding an image processing method of thermal images acquired by thermal image sensors, according to a fifth embodiment.
Background Leading to an Embodiment of the Present Disclosure In recent years, there have been studied air conditioning devices such as air conditions having infrared sensors to acquire two-dimensional thermal images (thermal distribution), and air conditioning devices which use infrared sensors (hereinafter referred to as "thermal image sensor") to detect locations of human bodies and heat sources and reflect this in air conditioning control are on the market.

Air conditioning devices which present sensory temperature and floor temperature information to the user, by presenting the user with the photographed thermal images, have also been proposed such as described in Japanese Unexamined Patent Application Publication No. 2011-80667.

However, the above-described air conditioning device which acquires thermal images and reflects detected locations of people and heat sources in the room in the air conditioning control has had a problem in that the thermal images acquired by the thermal image sensor cannot be confirmed from outside of the room (house) where the thermal image sensor is installed.

Accordingly, it is an object of the present embodiment to solve the conventional problem and to provide a way by which thermal images acquired by infrared sensors can be confirmed externally.
Underlying Knowledge Forming Basis of Thermal Image Processing Method According to the Present Embodiment As described above, there are being studied services and the like where thermal images acquired by an air conditioning device (air conditioner), for example, are presented to the user. On the other hand, the resolution of thermal images acquired by thermal image sensors installed in air conditioners has been improving, to realize comfort control of room temperature. High resolution may result in the outlines of people and objects being clearly represented in the acquired thermal images, to where personal features can be comprehended.

Accordingly, when considering service systems which can display thermal images acquired in-home outside of the home, and systems (businesses) which provide the acquired thermal images to a third party other than the owner, protection of privacy may be insufficient, even with thermal images.

To this end, the present thermal image processing method of a thermal image processing device, having an image acquisition unit, a privacy region determination unit, and an altered image generating unit, includes: the image acquisition unit acquiring a thermal image; the privacy region determination unit determining a pixel corresponding to a particular temperature range as being a privacy region; and the altered image generating unit altering the pixel corresponding to the privacy region.

Accordingly, the image can be altered only regarding portions of the image where the need for protection of privacy is great. Thus, images with enhanced protection of privacy can be generated without reducing information necessary for services using the thermal images or analysis of collected thermal images.

The particular temperature range may be 25° C. or higher and 40° C. or lower.

Accordingly, a more suitable region (human temperature) alone can be taken as the object of alteration.

The value of the lower limit temperature in the particular temperature range may be a value which changes in accordance with an environment temperature.

Accordingly, an even more suitable temperature region alone, which takes into consideration the ambient temperature, can be taken as the object of alteration.

The image acquisition unit may include thermal image storage to store an acquired thermal image, with the privacy region determination unit comparing multiple thermal images stored in the thermal image storage at different points-in-time, and determining temperature information of a pixel corresponding to the particular temperature range and exhibiting a large temperature difference in different multiple thermal images to be a privacy region.

Accordingly, portions other than people which do not need to be altered, such as equipment (appliances) can be excluded from the privacy region. Thus, a more suitable privacy region can be set.

The image acquisition unit may include thermal image storage to store information relating to an acquired thermal image, with the privacy region determination unit determining a part of a human body in a thermal image which is in the particular temperature region of the thermal image to be a privacy region, and the thermal image storage storing information relating to the thermal distribution at the region of the part of the human body in the thermal image.

The privacy region determination unit may include a facial image identification unit, the facial image identification unit identifying a facial region of a person in an acquired image, and take the region of the identified face to be the region of the part of the human body.

The altered image generating unit may change the shape of the region of part of the human body determined by the privacy region determination unit to be a privacy region into another shape, and superimpose information relating to the thermal distribution upon part of the changed shape.

Accordingly, an image where the protection of privacy has been enhanced can be generated, without losing information necessary to provided services using thermal images, such as thermal distribution and so forth.

The thermal image processing device may further include a mode determination unit, the mode determination unit acquiring a location of a person from an acquired thermal image, and at least the privacy region determination unit and altered image generating unit changing processing (mode) to be executed, based on a distance between the acquired location of the person and a thermal image sensor which has imaged the thermal image acquired by the image acquisition unit.

This enables optimal image generating to be performed in accordance with the situation of usage, without forcing the user to select a mode.

Thus, in the thermal image processing method according to the present embodiment, a thermal image is acquired, and pixels corresponding to a particular temperature range are altered.

Also, in the thermal image processing method according to the present embodiment, a part of a human body is recognized, the shape of the recognized part of the human body is changed, and thermal distribution information is superimposed on the part of the human body of which the shape has been altered.

According to the thermal image processing method of the present embodiment, thermal images acquired by the thermal image sensor can be presented to the user when out of the room (outdoors) and to third parties, and even in a case where images are leaked, privacy can be protected.

The present embodiment will now be described with reference to the drawings. Components which are the same may be denoted by the same reference numerals, and description thereof omitted.

Note that the descriptions made in the embodiment described below are all either comprehensive or specific examples. Values, shapes, materials, components, placements and connections of components, steps, orders of steps, and so forth, are only exemplary, and do not restrict the present embodiment. Components in the following embodiment which are not included in an independent Claim indicating the highest concept are described as being optional components. The arrangements described below are only exemplary and do not restrict the present system. The present system may be configured by combining the arrangements.

Figure 28:
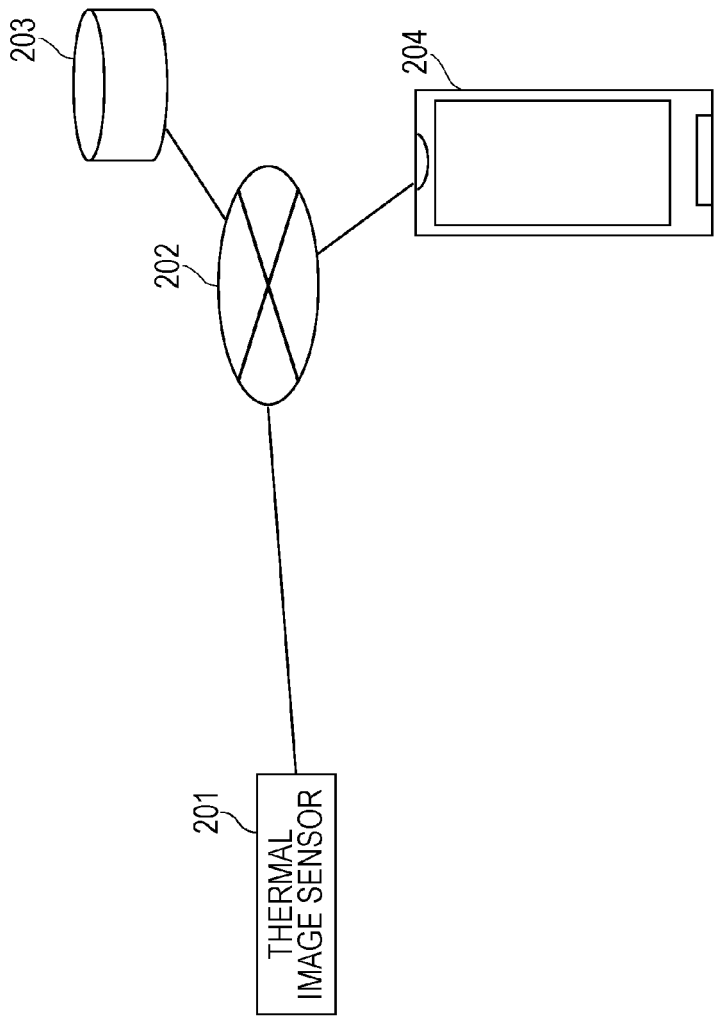
FIG. 28 is a schematic diagram illustrating a system including a thermal image sensor and thermal image display device.

FIG. 28 illustrates an example of a system including a thermal image display device and a thermal image sensor. The thermal image sensor 201 includes at least signal transmission unit, and the thermal image display device 204 includes at least a signal reception unit, the system being configured such that image data of thermal images is transmitted from the thermal image sensor 201 to the thermal image display device 204 via a network 202.

The thermal image sensor 201 may be a thermal distribution measurement unit made up of an infrared sensor such as a thermopile or bolometer. The thermal image sensor 201 may be installed in an air conditioning device as described above, but is not restricted to that arrangement.

The thermal image display device 204 may be a self-luminescent display such as an organic electro-luminescence (EL) display, or may be a display having a backlight and space modulation device such as liquid crystal. The thermal image display device 204 may conceivably be a smartphone or tablet which the user of the thermal image sensor 201 has, for example. The display may be a display or the like which a user other than the user using the thermal image sensor 201 (or business) can confirm.

The signal transmission/reception units of the thermal image sensor 201 and thermal image display device 204 may be transmission/reception units using communication formats such as Wi-Fi (a registered trademark), Bluetooth (a registered trademark), Long Term Evolution (LTE), or the like.

The configuration illustrated in FIG. 28 enables thermal images to be presented to the user who is away from the location where the thermal image sensor is installed, or to third parties.

Figure 27:
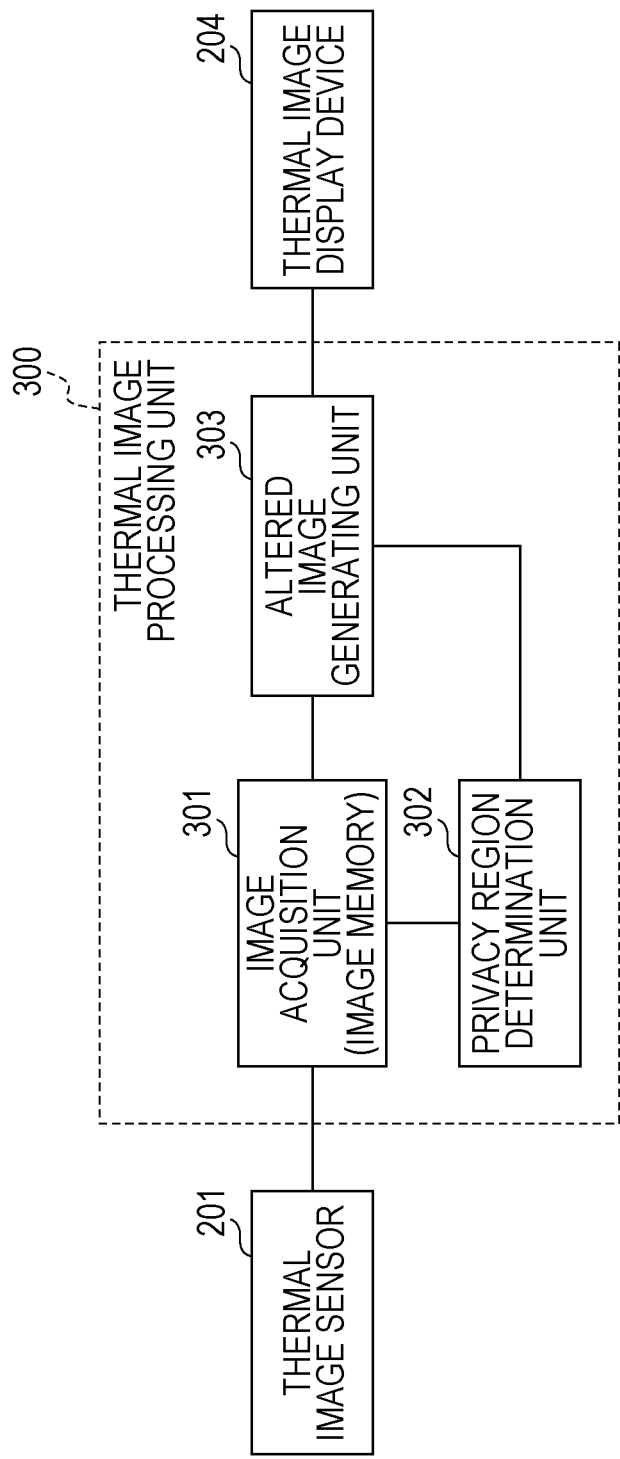
FIG. 27 is a block diagram illustrating a thermal image processing unit, thermal image sensor, and thermal image display device, according to a fifth embodiment.

In the system illustrated in FIG. 28 where image data of thermal images is transmitted to the thermal image display device 204 via the network 202, one or both of the thermal image display device 204 and thermal image sensor 201 has a thermal image processing unit 300 such as illustrated in FIG. 27.

A server 203 may be connected to the network 202. The server 203 may have a thermal image processing unit 300. Thus, the thermal images acquired by the thermal image sensor 201 can be saved at the server 203. Further, the thermal images acquired by the thermal image sensor 201 may be altered by image processing at the server 203.

In a case of performing the above-described image processing, the thermal image sensor 201 or thermal image display device 204 themselves may have memory to save thermal images and signal processing units which perform image processing, but using a server 203 connected to the network 202 enables the thermal image sensor 201 and thermal image display device 204 to be smaller and less expensive.

The thermal image processing unit 300 includes an image acquisition unit 301, privacy region determination unit 302, and an altered image generating unit 303, as illustrated in FIG. 27. As described above, part or all of the configurations of the thermal image processing unit 300 may be included within the thermal image sensor 201, or may be included within the thermal image display device 204. In a case where a server 203 is connected to the network 202, all or part of the configurations of the thermal image processing unit 300 may be included in the server 203. Processing performed by the configurations of the thermal image processing unit 300 will be described below.

The image acquisition unit 301 acquires a thermal image from the thermal image sensor 201. The image acquisition unit 301 may include functions to serve as thermal image storage (memory) for storing the acquired image.

The privacy region determination unit 302 determines a privacy region (pixels) in a thermal image acquired (stored) by the image acquisition unit 301. The method of determining the privacy region will be described later.

The altered image generating unit 303 alters temperature information of the privacy region (pixels) determined by the privacy region determination unit 302. Alternatively, the altered image generating unit 303 may make the privacy region (pixels) determined by the privacy region determination unit 302 to be non-displayable. Accordingly, the altered image generating unit 303 alters an acquired thermal image into a thermal image with lower privacy factor. The thermal image with lower privacy factor, which has been generated by the altered image generating unit 303, is transmitted to the thermal image display device 204 and displayed.

As described above, the present system has the thermal image processing unit 300, so images taken by the thermal image sensor 201 which the user who is in the images does not want others to see, can be altered into images which do not matter if someone else sees. Accordingly, a business operating a server 203, for example, can provide the acquired thermal images to a third part (corporation or individual) for research or the like, as thermal image with low privacy factor, so protection of privacy can be realized. Also, this can facilitate application to thermal images acquired regarding the individual who has the thermal image display device 204, being shared with family or others at a remote location, or being posted on the Internet.

One conceivable usage of providing a third part with thermal images is a case of a thermal image sensor being installed in the home of an elderly person, and the acquired images being provided to family, a hospital, workers at a care facility, or the like, at remote locations, so as to monitor the well-being of the elderly person. Using a visible-light camera for this purpose may be undesirable in view of protection of on the privacy of this elderly person. The very fact of using a thermal image sensor would result in may elderly people not caring about privacy issues, but further providing the thermal image processing unit 300 illustrated in FIG. 28 can enhance protection of privacy on the elderly even further. That is to say, this arrangement allows for monitoring of the elderly with more enhanced protection of privacy, even when compared with unaltered thermal images.

Also, the need for monitoring for falling or the like due to heat shock (heart attack and stroke risk) in situations where change in temperature to the body is great, such as when removing clothing to bathe or use a toilet, is not limited to the elderly. However, installing image sensors in baths and restrooms is very problematic from the perspective of privacy. On the other hand, the system using the thermal image processing unit according to the present embodiment is desirable since monitoring can be performed while protecting privacy of the user of the bath or toilet.

Figure 29:
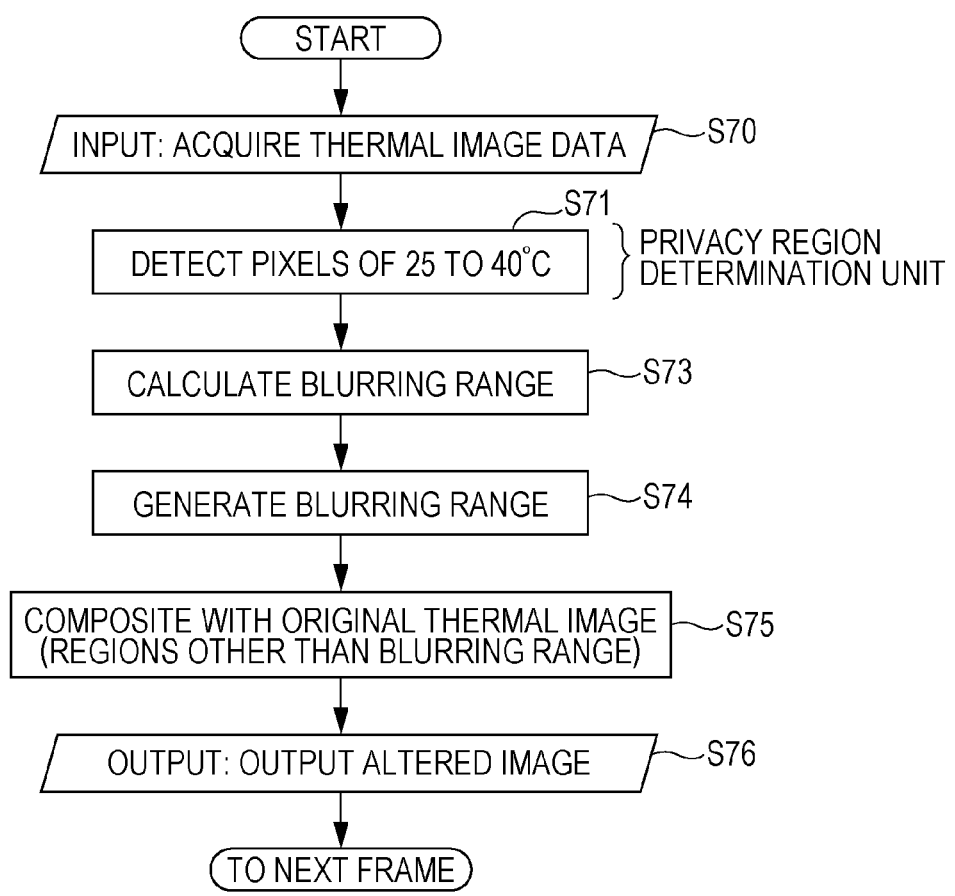
FIG. 29 is a flowchart illustrating a thermal image processing method according to a fifth embodiment.

The following is a description of operations of the thermal image processing unit 300, and how images are altered by the thermal image processing unit 300. FIG. 29 is a flowchart illustrating an example of processing performed within the thermal image processing unit 300.

In the example in FIG. 29, the image acquisition unit 301 first acquires thermal image data (S70).

Next, The privacy region determination unit 302 extracts pixels in the range of 25° C. to 40° C., from the data of the thermal image acquired by the image acquisition unit 301 (S71). The privacy region determination unit 302 then determines the corresponding pixels to be a "blurring range" (S73).

Next, the altered image generating unit 303 adds thermal distribution information different from the original thermal distribution information of the pixels, thereby generating a blurred image (S74). Here, a blurred image is generated by performing averaging processing among adjacent pixels in the region determined to be a blurring region, for example.

The altered image generating unit 303 then composites the blurred image with the pixels in the original thermal image other than the "blurring range", thus generating an altered image (S75). The altered image generating unit 303 then outputs the altered image (S76). The altered image generated by the altered image generating unit 303, is transmitted to the thermal image display device 204.

The privacy region determination method by the privacy region determination unit 302 used here relates to being "within a temperature range of 25° C. to 40° C.". This temperature corresponds to the body temperature of people in general. The human body maintains the same temperature, regardless of the ambient temperature. Accordingly, using determination conditions where pixels of a temperature near the human body temperature are taken as the privacy region enables the human body to be blurred in a stable manner. Thus, the region of the "human body", which has information indicating the form of the body and which might lead to individual identification, is not displayed as it is, thereby enabling privacy to be protected.

While the lower limit temperature of the privacy region has been described as being 25° C. and the upper limit temperature as 40° C., this is not necessarily restricted to this temperature range. For example, the lower limit temperature may be a temperature which is 2° C. higher than the temperature at that location (e.g., temperature of the environment). Accordingly, a greater amount of information of regions other than the human body region can be left unaltered even in a hot environment. That is to say, loss of information of protection of privacy can be reduced. In this case, the location where the thermal image sensor is installed preferably has a device to measure temperature installed.

With the temperature of the environment as T° C., the lower limit temperature may be calculated by $$\{(36+X \times T)/(1+X)\}° C.$$

so that the lower limit temperature is between 36° C. (assumed body temperature) and the temperature of the environment. For example, if X=1, the average temperature between 36° C. and the temperature of the environment becomes the lower limit temperature. By setting a boundary temperature to be a temperature between the body temperature and the temperature of the environment, loss of information due to protection of privacy can be reduced even in hot environments and cold environments.

Also, the value of X may be changed depending on whether a hot environment or a cold environment. In a hot environment, the smaller X is, the better. The user will be often wearing fewer clothes in a hot environment as compared to a cold environment. The fewer the articles of clothing the user is wearing, the closer the measured temperature at the surface of the clothing is to the body temperature, as compared to the temperature of the environment, so a suitable lower limit temperature can be set by making the value of X to be smaller the hotter the environment is. Accordingly, portions of clothing can be judged as being privacy regions, and stable protection of privacy can be facilitated, while suppressing loss of information due to protection of privacy in both hot environments and cold environments.

The lower limit temperature may be set to 33° C., which is somewhat high. Accordingly, the clothing portions can be excluded from the privacy region, and only portions (pixels) where skin is bare be used as privacy regions. Thus, both minimal privacy protection and minimal information loss can be realized for users who do not care unless nudity is displayed.

While a privacy region determination method has been proposed with several lower limit temperatures set, an arrangement may be made where not only pixels determined by the above-described method are used as privacy regions, but surrounding pixels are also taken as privacy regions. For example, pixels next to pixels corresponding to the range of the lower limit temperature through the upper limit temperature may also be taken as privacy regions. Setting a broader privacy region yields thermal images where more stable privacy protection is enabled. In the same way, pixels two pixels away, or three pixels away, from pixels corresponding to the range of the lower limit temperature through the upper limit temperature may also be taken as privacy regions.

Although the method of blurring the privacy regions has been used to generate an altered image in the example illustrated in FIG. 29, other methods may be used for this alteration. For example, an entire privacy region may be set to non-display (where no temperature information is displayed), and instead this region is filled in with solid black, solid white, hatching, polka-dots, or the like. The alteration may also change the display of temperature information all to a "certain temperature" (e.g., all changed to 30° C.), or the like. Another arrangement is to perform mosaic processing, such as randomly selecting the temperature of one of four adjacent pixels and displaying that temperature.

Figure 31:
FIG. 31 is a diagram illustrating a thermal image acquired by the thermal image sensor.
Figure 32:
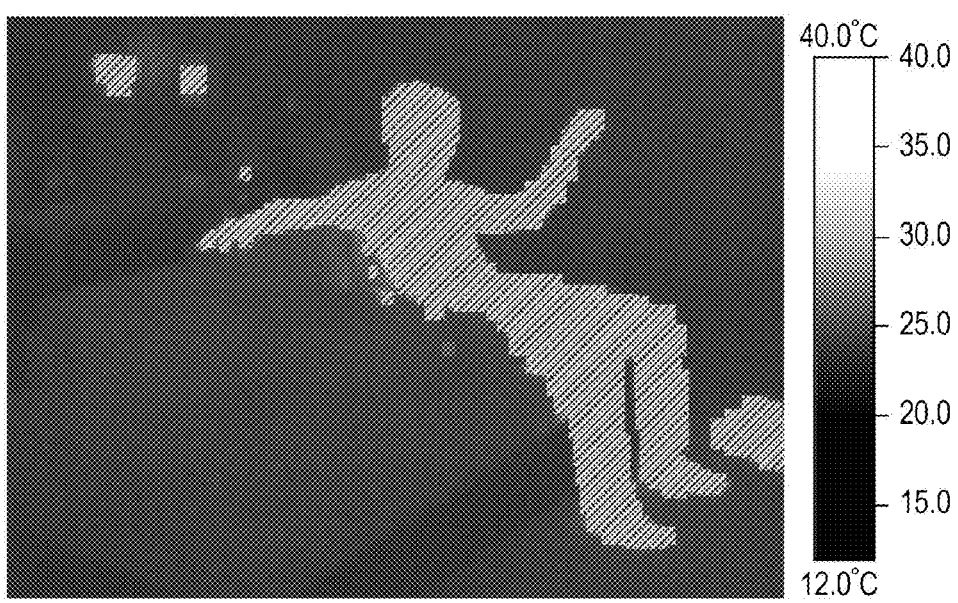
FIG. 32 is a diagram (illustrative drawing) illustrating an altered image which has been altered using the thermal image processing method according to the fifth embodiment.

Examples of altered images obtained by the above thermal image processing will be described with reference to the drawings. For example, in a case where a thermal image such as illustrated in FIG. 31 is acquired, setting the region from 25° C. to 40° C., and further pixels adjacent thereto, as a privacy region, and performing thermal image processing by filling in with hatching, yields an altered image such as illustrated in FIG. 32.

Figure 33:
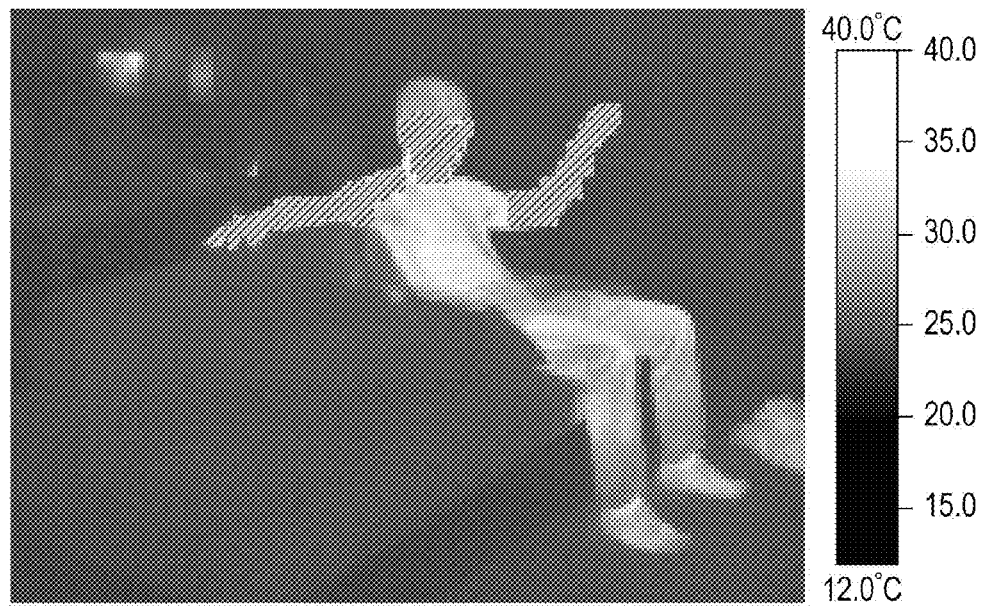
FIG. 33 is a diagram (illustrative drawing) illustrating an altered image which has been altered using another thermal image processing method according to the fifth embodiment.

In a case where the lower limit temperature of the privacy region is set to 33° C., as illustrated in FIG. 33, an image is obtained where only regions where the skin is bare are filled in with hatching. It should be noted that the temperature of human skin does change somewhat in accordance with the temperature of the environment, it is more preferable to estimate the body surface temperature based on the temperature of the environment, and set the lower limit temperature accordingly.

Figure 30:
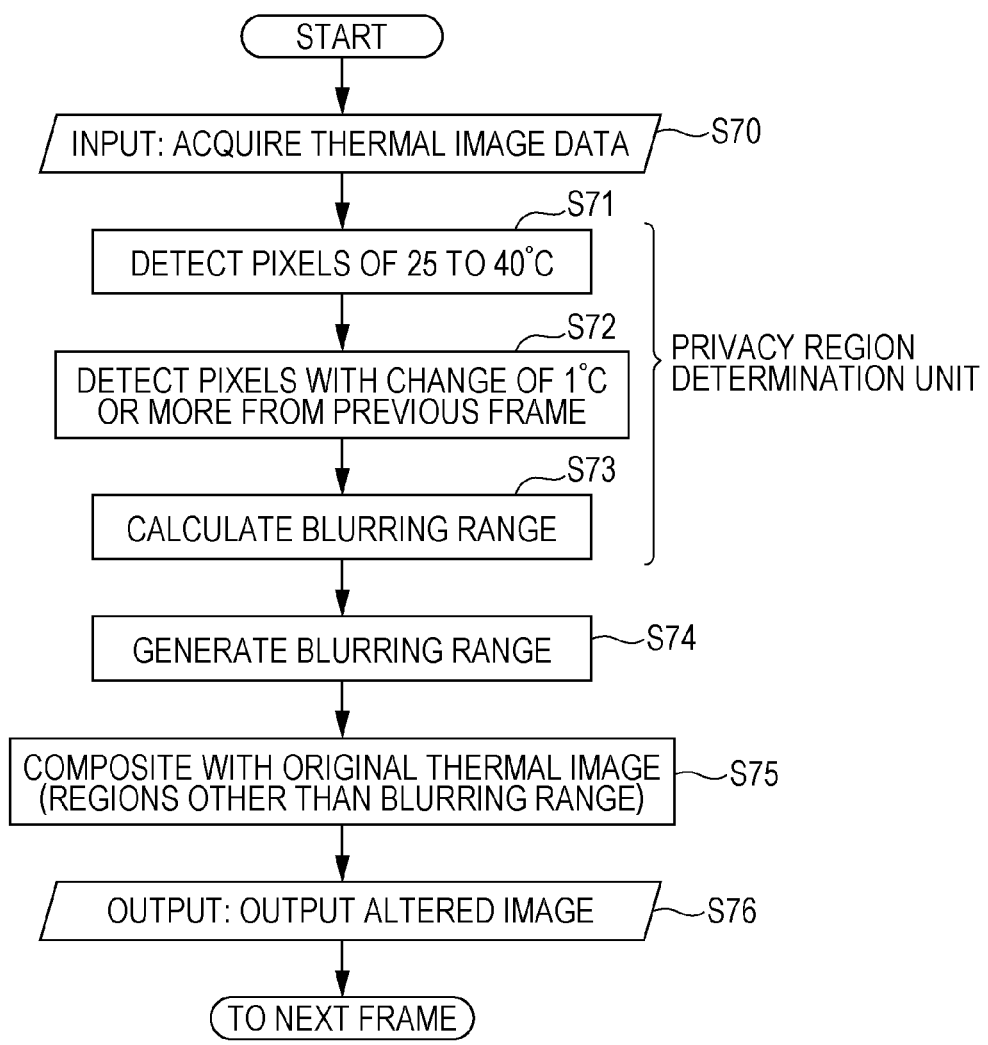
FIG. 30 is a flowchart illustrating another thermal image processing method according to the fifth embodiment.

FIG. 30 is a flowchart illustrating an example of processing performed within the thermal image processing unit 300. In FIG. 30, steps which are the same as those in FIG. 29 are denoted by the same reference numerals, and detailed description thereof will be omitted. An arrangement may be made such as illustrated in FIG. 30, where both of the two conditions "temperature in range from 25° C. to 40° C." and "pixels of which temperature change from previous frame is 1° C. or greater" being satisfied is the privacy region determination conditions. A determination method for "pixels of which temperature change from previous frame is 1° C. or greater" will be described below.

Here, the image acquisition unit 301 includes functions serving as thermal image storage (not illustrated) for storing the acquired thermal images. The privacy region determination unit 302 compares multiple thermal images measured at different points-in-time, stored in the thermal image storage, and identifies pixels with large temperature difference. More specifically, the privacy region determination unit 302 compares a current frame with a previous frame (a frame of which the acquisition point-in-time is one earlier than the current frame). The privacy region determination unit 302 then determines pixels, regarding which both of the two conditions "temperature in range from 25° C. to 40° C." and "pixels of which temperature change from previous frame is 1° C. or greater" are satisfied, as a privacy region (S72).

Figure 34:
FIG. 34 is a diagram (illustrative drawing) illustrating an altered image which has been altered using another thermal image processing method according to the fifth embodiment.

Thus, by adding the condition where an object moves from the previous frame and consequently the temperature of the same pixel changes by 1° C. or more as a condition, other objects besides human bodies which generate heat, such as appliances, are not determined to be privacy regions, and only pixels of the human body are taken as privacy regions, as illustrated in FIG. 34. Note that the object of comparison has been described as the previous frame, but this may be comparison with an image several frames earlier, or may be comparison with an average value of pixels in the frames from several frames back going backwards several frames further.

Figure 35:
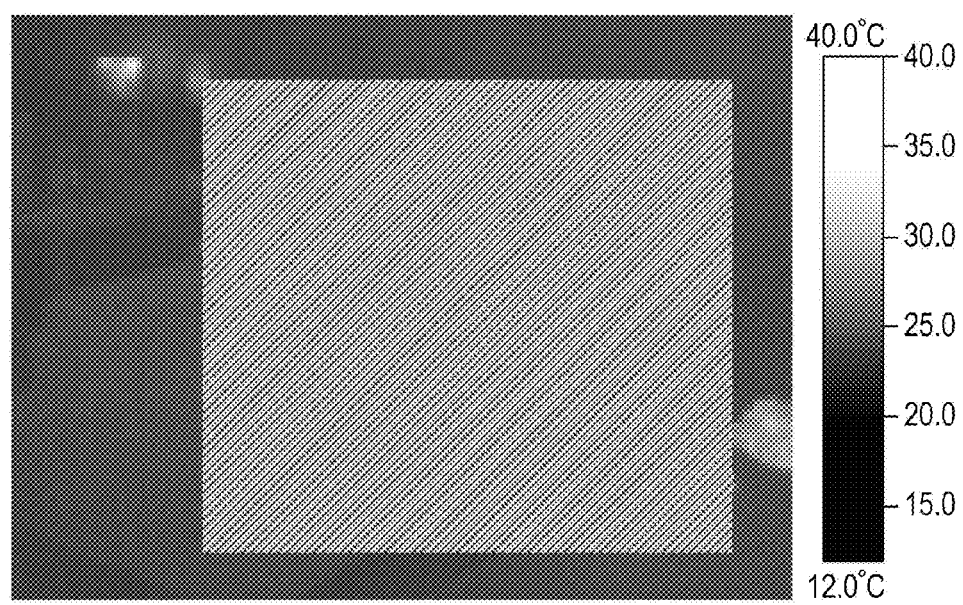
FIG. 35 is a diagram (illustrative drawing) illustrating an altered image which has been altered using another thermal image processing method according to the fifth embodiment.

Alternatively, an arrangement may be made where a background image excluding moving objects is saved in memory, and moving objects are detected by background differencing to take only regions of moving objects as privacy regions. Also, an arrangement may be made where a smallest rectangular region, which will cover the privacy region determined by the above-described method, is used as the privacy region. Accordingly, information such as the posture or build of the body of the user is not viewable, as illustrated in FIG. 35, so privacy protection where a broader range of information leakage can be prevented is enabled.

Figure 36:
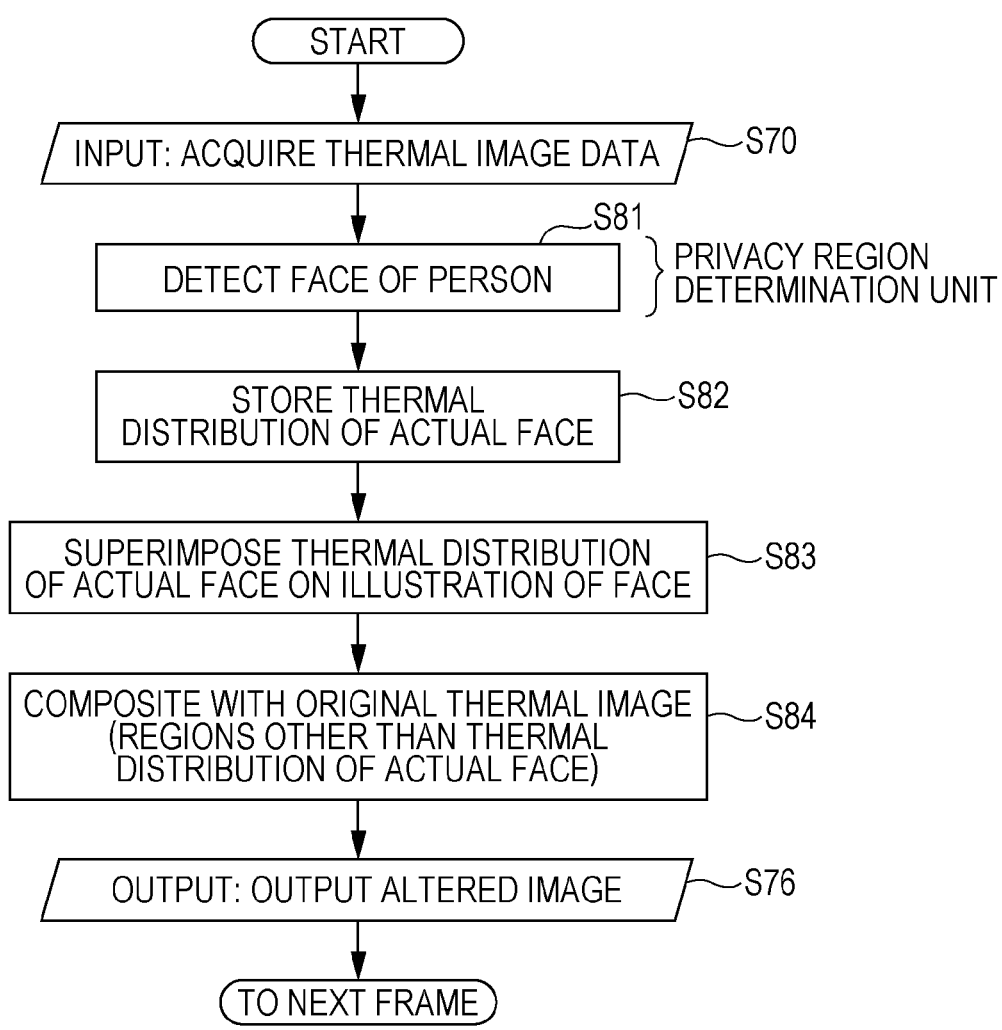
FIG. 36 is a flowchart illustrating another thermal image processing method according to the fifth embodiment.

An example where a privacy region is determined, and alteration is performed where the temperature information of the privacy region (pixels) is changed, or temperature information is not displayed, such as illustrated in the flowcharts in FIGS. 29 and 30, has been described. Next, another thermal image processing method, illustrated in FIG. 36, will be described. In FIG. 36, Steps which are the same as those in FIG. 29 are denoted by the same reference numerals, and detailed description thereof will be omitted.

Figure 37:
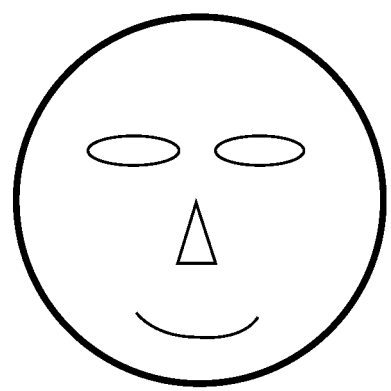
FIG. 37 is a diagram illustrating an illustrative drawing of a face.

In the example illustrated in FIG. 36, the privacy region determination unit 302 detects part of the human body (the face of a person here) from the thermal image acquired at the thermal image sensor 201 (S81). The image acquisition unit 301 (thermal image storage) stores the thermal distribution of the face of the person regarding which the privacy region determination unit 302 has determined (hereinafter, "thermal distribution of the actual face") (S82). The image acquisition unit 301 (thermal image storage) may also store thermal distribution of regions other than the face of the person, as well. The altered image generating unit 303 then superimposes the thermal distribution of the actual face on an illustration of a face such as illustrated in FIG. 37 (S83). The illustration of the face upon which the thermal distribution of the actual face has been super impose is overwritten on the position of the face in the thermal image, thus yielding an altered image (S84).

The method by which the privacy region determination unit 302 recognizes a person's face is not restricted in particular here. The privacy region determination unit 302 may include a facial image identification unit, so as to identify a region in a thermal image which satisfies predetermined conditions representing facial features, as the region of a face. The predetermined conditions representing facial features as used here may be conditions relating to certain temperature conditions in a facial shape, or certain shapes, for example. Conditions unique to thermal images can be seen in a face, such as the temperature of the nose is lower than the temperature of other facial regions, while the temperature of the forehead is high. The facial image identification unit identifies the position of a face using such features.

Figure 38:
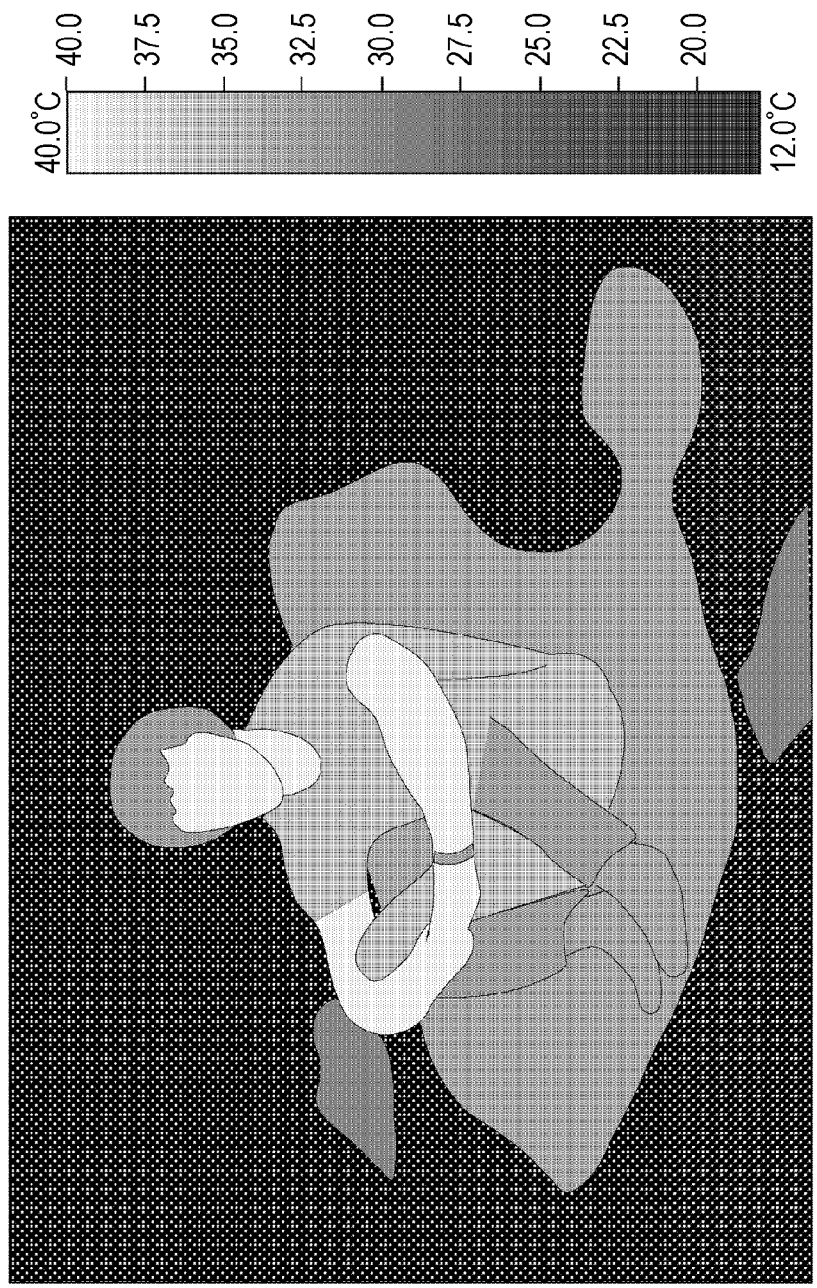
FIG. 38 is a diagram illustrating another thermal image acquired by the thermal image sensor.
Figure 39:
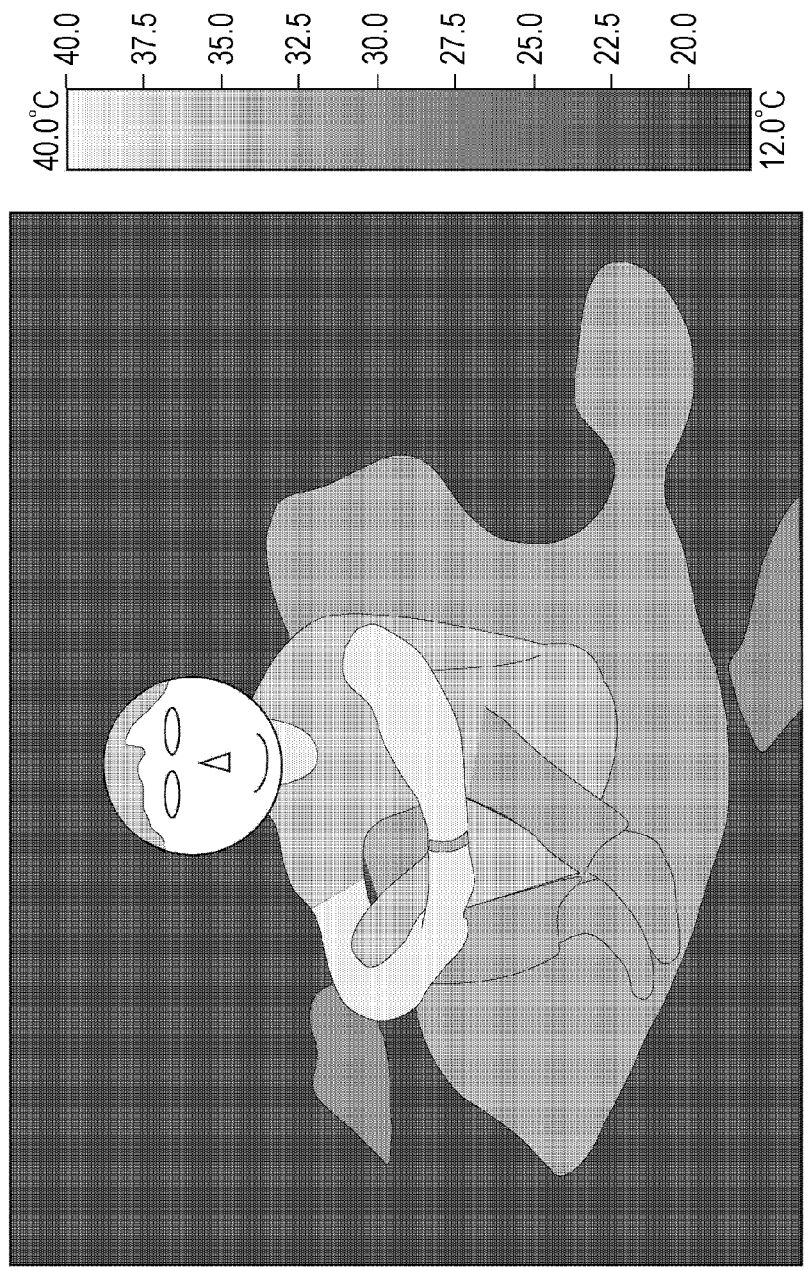
FIG. 39 is a diagram (illustrative drawing) illustrating an altered image which has been altered using another thermal image processing method according to the fifth embodiment.

The thermal image processing such as illustrated in the flowchart in FIG. 36 yields an altered image such as illustrated in FIG. 39 from the thermal image illustrated in FIG. 38. This thermal image processing allows the facial thermal distribution to be conveyed, for example, while making it difficult to tell whose face is in the image.

For example, a user might take a thermal image of him/herself using a thermal image sensor, and present this to a dermatologist at a remote location. The user can consult the dermatologist regarding whether the facial temperature is low to where wrinkles and age spots might easily occur, and receive advice on facial exercises to improve the facial temperature, recommended dietary menus, and so forth, by conveying the thermal distribution alone while keeping the face hidden. In other words, both protection of privacy, and conveying the user's own facial temperature distribution information, can be realized at the same time.

An example of a different usage is "chronic coldness type diagnosis", using a thermal image of the user in the full nude. There are several types of chronic coldness, and each type needs to be countered differently. Accordingly, having someone determine the type of chronic coldness based on the full-body thermal distribution enables more effective measures to be taken.

Figure 40:
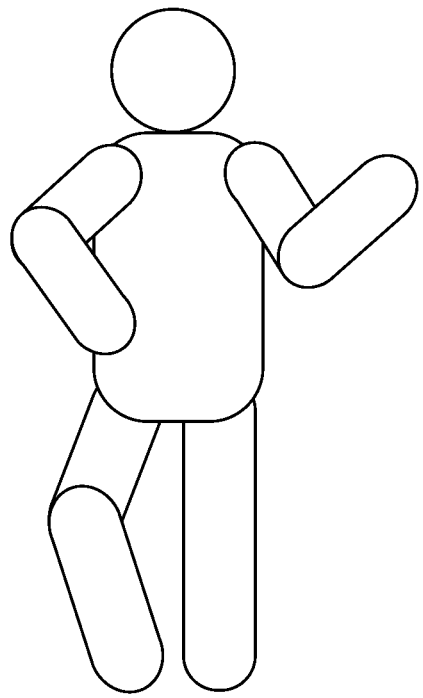
FIG. 40 is a diagram illustrating an illustrative drawing of a body.

In this case, the thermal distribution of the body of the user is superimposed on a full-body illustration such as illustrated in FIG. 40, as a "thermal distribution of actual body", in the same way as with the flow illustrated in FIG. 36. Thus, the user can convey the body surface temperature distribution without the actual nude thermal image of the user being seen.

Description has been made here regarding an example of displaying only thermal distribution of skin of the face or body or the like on the thermal image display device, while changing shape information. Facial detection may be performed by detecting a moving object by background differencing, and determining a region in the pixels of the moving object which are the highest but 40° C. or lower as being the face. Body temperature detection may be performed by the user taking an image in the full nude in a state of the body temperature being high, such as after having bathed in hot water, and regions 33° C. or higher being determined as being the body. Boundaries of the face and body may be found by extracting pixels where temperature difference as to an adjacent pixel is great, and using as a boundary line.

The superimposing of actual thermal distribution described above may be any method which replicates the thermal distribution in the actual image on the illustration. For example, a method may be employed where the pixels in the actual images are stretched so that the outline in the actual image and the outline of the illustration match.

The thermal image processing method according to the present embodiment has been described so far. Using the thermal image processing method according to the present embodiment enables information such as the shape and temperature distribution of privacy regions (human body) to be altered. However, image recognition technology may be used to identify the individual based on the original thermal distribution and shape information, and displaying a name indicating that person (individual name, or position in family such as Father), for example. Increasing information while protecting privacy enables the scope of usages of thermal images to be broadened.

The thermal image processing method according to the present embodiment preferably includes a user interface (UI) by which the user can freely select, from multiple thermal image processing methods, a thermal image processing method which he/she likes the most. Both suitable privacy protection and information disclosure can be realized according to each usage. The user preferably can also select the number of pixels in the thermal image to be displayed, and the color combination. Enabling each user to select the number of pixels and color combination allows individual users to adjust information disclosure amounts of personal concern.

Moreover, several operating modes may be prepared, with different thermal image processing methods, and different information such as number of pixels, being prepared for each mode. For example, in a beauty mode, the number of pixels might be reduced, and the tone might be grayscale with thermal image processing being performed to change the shape. In a monitoring mode, the number of pixels might be increased, and the tone might be an iron color, with thermal image processing being performed to not display pixels in certain temperature regions. Thus, thermal image processing method, the number of pixels, and tone can be selected so as to be optimal for each usage.

The thermal image processing unit 300 may also include a mode determining unit (not illustrated) to automatically determine a mode. The mode determining unit might determine to use the beauty mode if a moving object (person) is near the thermal image sensor 201, and instruct the image acquisition unit 301, privacy region determination unit 302, and altered image generating unit 303 to perform the processing illustrated in FIG. 36. On the other hand, the mode determining unit might determine to use the monitoring mode if a moving object (person) is far from the thermal image sensor 201, and instruct the image acquisition unit 301, privacy region determination unit 302, and altered image generating unit 303 to perform the processing illustrated in FIG. 29 or 30. This does away with the need for the user to manually change modes.

An arrangement may be made where determination of whether the moving object (person) is close to the thermal image sensor 201 or far away is determined based on the acquired thermal image, where determination is made that the person is near when the number of pixels determined to be the privacy region is equal to or greater than a predetermined threshold value, and determined to be far when the number of pixels is less than the threshold value. Determination may also be made regarding whether the moving object (person) is near or far, in cooperation with other sensors (a human detection sensor, or sensors or the like installed in other devices).

In the present embodiment, the thermal image processing unit 300 may be built into the thermal image sensor 201, or built into the thermal image display device 204, but preferably is within a server 203 on the network 202, as this reduces the size and weight of the thermal image sensor 201 and thermal image display device 204. On the other hand, a configuration where the thermal image processing unit 300 is built into the thermal image sensor 201 is most desirable from the perspective of safety.

The thermal image sensor 201 illustrated in FIG. 28 is described as being installed standalone, but this is not restrictive. For example, the thermal image sensor 201 may be provided to home appliances such as an air conditioning device or humidifier, or may be provided to facilities such as a washstand or bathroom.

The thermal image processing method according to the present embodiment is not restricted to a system where a thermal image sensor and a thermal image display device are connected via a network as illustrated in FIG. 28, and may be used in devices where the thermal image sensor and thermal image display device are integral. Even in arrangements where the sensor and display device are integral, the thermal images which have been taken might be seen by a third party, and further might be used effectively by showing to a third party. Accordingly, the thermal image processing method such as described in the present embodiment is preferably used. This enables necessary information to be retained while also realizing protection of privacy.

In the above-described embodiments, the components may be configured as dedicated hardware, or may be realized by executing a software program suitable for each component. Each component may be realized by a program execution unit such as a central processing unit (CPU) or processor reading out a software program stored in a recording medium such as a hard disk, semiconductor memory, or the like, and executing the software program.

Thus, the thermal image processing method according to the present embodiment can remove information which is highly private from thermal images. The thermal image processing device and processing method according to the present embodiment is applicable to a wide variety of usages, such as monitoring the elderly, receiving beauty services using information of skin temperature distribution of the face or body, and so forth.

Other Embodiments

Although the sensing method and sensing system, air conditioner having the same, and thermal image processing method, according to one or multiple forms of the present disclosure have been described by way of embodiments, the present disclosure is not restricted to these embodiments. Various modifications and combinations of the embodiments conceivable by one skilled in the art without departing from the essence of the present disclosure are also encompassed as being included in one or multiple forms of the present disclosure. For example, the following are encompassed by the present disclosure.

The above-described devices specifically are computer systems configured including a microprocessor, read-only memory (ROM), random access memory (RAM), a hard disk unit, display unit, keyboard, mouse, and so forth. A computer program is stored in the RAM or hard disk unit. The devices carry out the functions of the computer program by the microprocessor operating according to the computer program. A "computer program" as used here is a combination of multiple command codes representing commands to a computer to carry out certain functions.

Part of all of the components making up the devices may be configured including a single large-scale integration (LSI). A system LSI is a super-multifunctional LSI where multiple components are integrated upon a single chip, and is a computer system configured including a microprocessor, ROM, RAM, and so forth. The computer program is stored in the RAM. The system LSI carries out the functions of the computer program by the microprocessor operating according to the computer program.

Part of all of the components making up the devices may be configured including an integrated circuit (IC) card detachably mountable to the devices, or a standalone module. The IC card or module is a computer system configured including a microprocessor, ROM, RAM, and so forth. The IC card or module may include the above-described super-multifunctional LSI. The IC card or module carries out the functions of the computer program by the microprocessor operating according to the computer program. The IC card or module may be tamper-resistant.

The present disclosure may be the methods described above. The present disclosure may also be a computer program which realizes these methods by computer, and may be digital signals made up of the computer program.

The present disclosure may be a computer-readable recording media from which a computer can read the computer program or the digital signals, examples of the recording media including a flexible disk, hard disk, compact disc (CD)-ROM magneto-optical (MO) disk, digital versatile disc (DVD), DVD-ROM, DVD-RAM, Blu-ray (BD, a registered trademark) disc, semiconductor memory, and so forth. The present disclosure may also be the digital signals recorded in such recording mediums.

The present disclosure may be the computer program or the digital signals being transmitted via a telecommunication line, a wireless or cabled communication line, a network such as the Internet, data broadcasting, and so forth.

The present disclosure may be a computer system including a microprocessor and memory, in which the memory stores the computer program, and the microprocessor operates according to the computer program.

The program or the digital signals may be recorded in the recording medium and transported, or the program or the digital signals may be transmitted over the network or the like, so as to be carried out at another computer system which is independent.

The above-described embodiments and modifications may be combined.

The present disclosure is applicable to a sensing method and sensing system, and an air conditioner having the same, and is particularly applicable to a sensing method and sensing system, and an air conditioner having the same, installed in an air conditioner such as a pet air conditioner, monitoring air conditioner, health air conditioner, and so forth.

What is claimed is:

1. A sensing method comprising:
   acquiring a thermal image of an object space;
   identifying an object, within the object space, included in the thermal image, based on the acquired thermal image;
   presenting to a user the thermal image to which information, indicating identification results of the identifying, has been added; and
   accepting a response as to the presented thermal image to which the information has been added,
   wherein, in a case where the accepted response is an alteration instruction regarding the identification results, the identification results of the object included in the thermal image are altered in the identifying, in accordance with the alteration instruction, and
   wherein, at least one of the acquiring, the identifying, the presenting, and the accepting is performed by a processor.

2. The sensing method according to claim 1,
   wherein the object includes at least one of a person, animal, electrical appliance, and laundry, in the object space.

3. The sensing method according to claim 1,
   wherein the identifying includes
      determining thermal distribution represented in the acquired thermal image,
      determining and identifying the object, based on the determined thermal distribution, and
      determining a location in the object space of the identified object,
   wherein the object and the location of the object are included in the information representing the identification results, and presented in the presenting.

4. The sensing method according to claim 3,
   wherein a region of a pixel group, indicating a predetermined temperature range in the acquired thermal image, is determined to be the object in the determining of the object,
   and wherein a location of a region of a pixel group, indicating a predetermined temperature range in the acquired thermal image, is determined to be a location of the object in the determining of the location of the object.

5. The sensing method according to claim 3,
   wherein a region of a pixel group, indicating a predetermined first temperature range in the acquired thermal image, is determined to be a person in the determining of the object,
   and wherein a region of a pixel group, indicating a predetermined second temperature range in the acquired thermal image that is different from the predetermined first temperature range, is determined to be an animal.

6. The sensing method according to claim 1, further comprising:
measuring temperature distribution in the object space and outputting the measured temperature distribution as the thermal image;
determining a state in the object space including the identified object, based on the thermal image; and
notifying the user of notification information relating to the determined state of the object space.

7. The sensing method according to claim 6, further comprising:
determining whether or not there is the notification information of which the user should be notified; and
acquiring humidity information of the object space,
wherein the state of the object space including the identified object is determined in the determining of the state, based on the thermal image and the humidity information,
and wherein the user is notified of the notification information in the notifying, in a case where judgment is made that there is the notification information, in the determining of whether or not there is the notification information.

8. The sensing method according to claim 6, further comprising:
determining whether or not there is the notification information of which the user should be notified, based on the state of the object space determined in the determining of the state,
wherein the user is notified of the notification information in the notifying, in a case where judgment is made that there is the notification information, in the determining of whether or not there is the notification information.

9. The sensing method according to claim 6, further comprising:
controlling an air environment of the object space, based on the state of the object determined in the determining of the state.

10. The sensing method according to claim 9, further comprising:
acquiring humidity information of the object space,
wherein the air environment of the object space is controlled in the controlling based on the state of the object determined in the determining of the state, and the humidity information.

11. The sensing method according to claim 9,
wherein the air environment includes at least one of temperature, humidity, wind speed, and direction of wind, of air in the object space.

12. The sensing method according to claim 6, further comprising:
acquiring humidity information of the object space;
analyzing a state of the identified object, based on the thermal image and the humidity information; and
determining whether or not there is the notification information of which the user should be notified, based on analyzing results from the analyzing,
wherein the user is notified of the notification information in the notifying, in a case where judgment is made that there is the notification information, in the determining of whether or not there is the notification information.

13. The sensing method according to claim 1,
wherein registration of information relating to the object is accepted beforehand, in the accepting.

14. The sensing method according to claim 13,
wherein the information relating to the object includes at least one of types of the object, weight, age, and location.

15. The sensing method according to claim 10,
wherein the humidity information of the object space is humidity distribution of the object space,
and wherein, in the acquiring of the humidity information, humidity in the object space is measured, and the humidity distribution of the object space is calculated based on the measured humidity and thermal distribution represented in the acquired thermal image.

16. The sensing method according to claim 1,
wherein the user is notified of lifestyle improvement proposal information, proposing to the user a lifestyle improvement method, based on at least the humidity distribution.

17. A sensing system comprising:
a thermal image acquirer that acquires a thermal image of an object space;
an identifier that identifies an object, within the object space, included in the thermal image, based on the thermal image acquired by the thermal image acquirer;
a presenter that adds information indicating identification results from the identifier to the thermal image, and that presents to the user the thermal image to which the identification results have been added; and
a receptor that accepts a response as to the thermal image to which the information has been added, that has been presented by the presenter,
wherein, in a case where the accepted response is an alteration instruction regarding the identification results, the identification results of the object included in the thermal image are altered in the identifier, in accordance with the alteration instruction, and
wherein, at least one of thermal image acquirer, the identifier, the presenter, and the receptor includes a processor.

18. An air conditioner comprising:
a thermal image acquirer that acquires a thermal image of an object space;
an identifier that identifies an object, within the object space, included in the thermal image, based on the thermal image acquired by the thermal image acquirer;
a presenter that adds information indicating identification results from the identifier to the thermal image, and that presents to the user the thermal image to which the identification results have been added; and
a receptor that accepts a response as to the thermal image to which the information has been added, that has been presented by the presenter,
wherein, in a case where the accepted response is an alteration instruction regarding the identification results, the identification results of the object included in the thermal image are altered in the identifier, in accordance with the alteration instruction, and
wherein, at least one of thermal image acquirer, the identifier, the presenter, and the receptor includes a processor.

* * * * *